US007775461B2

(12) United States Patent
Laidler et al.

(10) Patent No.: US 7,775,461 B2

(45) Date of Patent: Aug. 17, 2010

(54) NOZZLE DEVICES

(75) Inventors: Keith Laidler, Stourbridge (GB); Timothy Rodd, Lindhurst (GB)

(73) Assignee: Incro Limited, Wollaston Stourbridge, West Midlands (GB)

(*) Notice: Subject to any disclaimer, the term of this patent is extended or adjusted under 35 U.S.C. 154(b) by 405 days.

(21) Appl. No.: 12/005,899

(22) Filed: Dec. 28, 2007

(65) Prior Publication Data

US 2008/0121661 A1 May 29, 2008

Related U.S. Application Data

(63) Continuation of application No. 10/545,592, filed as application No. PCT/GB2004/000614 on Feb. 17, 2004, now Pat. No. 7,357,335.

(30) Foreign Application Priority Data

| | | |
|---|---|---|
| Feb. 18, 2003 | (GB) | 03003698 |
| Mar. 12, 2003 | (GB) | 0305597 |
| Apr. 17, 2003 | (GB) | 0308909 |
| May 3, 2003 | (GB) | 0310244 |
| Aug. 1, 2003 | (GB) | 0318022 |
| Sep. 4, 2003 | (GB) | 0320720 |
| Nov. 25, 2003 | (GB) | 0327423 |
| Jan. 15, 2004 | (GB) | 0400858 |

(51) Int. Cl.
*B62C 11/00* (2006.01)
*B05B 1/34* (2006.01)

(52) U.S. Cl. ....................... 239/362; 239/323; 239/363; 239/468

(58) Field of Classification Search ................. 239/302, 239/303, 356, 362, 363, 373, 330, 327, 323, 239/328, 337, 468; 222/207, 209, 211, 212
See application file for complete search history.

(56) References Cited

U.S. PATENT DOCUMENTS

| | | | |
|---|---|---|---|
| 3,726,442 | A | 4/1973 | Davidson et al. |
| 3,820,689 | A | 6/1974 | Cocita |
| 4,182,465 | A | 1/1980 | Bennett |
| 4,216,882 | A | 8/1980 | Basile et al. |

(Continued)

FOREIGN PATENT DOCUMENTS

| | | |
|---|---|---|
| EP | 0253577 A2 | 1/1988 |

(Continued)

*Primary Examiner*—Davis Hwu
(74) *Attorney, Agent, or Firm*—John H. Pearson, Jr., Esq.; Walter F. Dawson, Esq.; Pearson & Pearson LLP

(57) ABSTRACT

This invention relates to pump-action nozzle devices methods of making the same. The nozzle devices of the invention comprises a body which defines an internal chamber having an inlet through which fluid may be drawn into said chamber and an outlet through which fluid present in the chamber may be expelled from the nozzle. The inlet comprises an inlet valve and the outlet comprises an outlet valve. Fluid is dispensed from the dispenser nozzles by applying pressure to an actuator member that engages and resiliently deforms or displaces a portion of the body of the device that defines the chamber, thereby compressing the chamber and actuating the dispensing of fluid. In preferred embodiments, the actuator provides a rigid actuator surface that an operator can apply a pressure to.

63 Claims, 18 Drawing Sheets

U.S. PATENT DOCUMENTS 4,225,061 A * 9/1980 Blake et al. ................. 222/207
4,301,967 A * 11/1981 Hunter ......................... 239/99
5,114,052 A * 5/1992 Tiramani et al. ............ 222/207
5,303,867 A * 4/1994 Peterson ...................... 239/333
2002/0074359 A1 6/2002 Weber

FOREIGN PATENT DOCUMENTS

EP 0442858 A2 8/1991
EP 0649684 A2 4/1995
FR 2127774 10/1972
FR 2581370 11/1986
WO WO 01/89958 A2 11/2001
WO WO 03/049916 A1 6/2003

* cited by examiner 2001
101
2003

2004
2001
2002
113
2701
101b
108
101
103
112
109
102a
2610
2700

2002
2701
2610
2611
2001
2004
201
702
102b
109
102
112
2001a
113
2003
101
701

NOZZLE DEVICES

CROSS REFERENCE TO RELATED APPLICATIONS

This application is a continuation of application Ser. No. 10/545,592, filed on Apr. 21, 2006, now U.S. Pat. No. 7,357,335 which is the National Stage of International Application No. PCT/GB2004/000614, filed Feb. 17, 2004, and which is incorporated herein by reference and claims priority of Applications No. GB0400857.7, filed Jan. 15, 2004; GB0327423.0, filed Nov. 25, 2003; GB0320720.6, filed Sep. 4, 2003; GB0318022.1, filed Aug. 1, 2003; GB0310244.9, filed Mar. 5, 2003; GB0308909.1, filed Apr. 17, 2003; GB0305597.7, filed Mar. 12, 2003, and G03003698.5, filed Feb. 18, 2003.

BACKGROUND OF THE INVENTION

1. Field of the Invention

This invention relates to nozzle devices and, more particularly but not exclusively, to pump-action nozzle devices and methods of making such devices.

2. Description of Related Art

Pump-action nozzle devices are commonly used to provide a means by which fluids can be dispensed from a non-pressurised container.

Conventional pump-action nozzle devices tend to be extremely complex in design and typically comprise numerous component parts (usually between 8 and 10 individual components in pump nozzle devices and between 10 and 14 individual components in trigger-actuated nozzle devices). As a consequence, these devices can be costly to manufacture due to the amount of material required to form the individual components and the assembly processes involved. In addition, many of the conventional devices tend to be bulky (which again increases the raw material costs) and a proportion of this bulk is invariably disposed inside the container to which the device is attached. This is a further drawback because the nozzle takes up a proportion of the internal volume of the container, which can be a particular problem in small containers where the available space inside the container is limited.

Examples of dispenser nozzle devices of simpler construction are disclosed in EP 0 442 858 A2 and U.S. Pat. No. 3,820,689 and EP 0 649 684. The nozzle arrangements disclosed in these citations comprise at least two separate component parts, including a base part and an upper part. The upper part is fitted to the upper surface of the base to define an internal chamber having an inlet equipped with an inlet valve and an outlet equipped with an outlet valve. The upper part is formed from a resiliently deformable material, whereas the base part is formed from a rigid plastic material. The upper part forms a generally dome-shaped protrusion on the upper surface of the device, which can be pressed and deformed by an operator to compress the internal chamber and facilitate the dispensing of any fluid present therein.

SUMMARY OF THE INVENTION

A problem with the aforementioned devices is that an operator is required to press the resiliently deformable dome-shaped portion inwards using their thumb or finger in order to dispense fluid from the internal chamber. This requires a certain amount of co-ordination on the part of the operator as well as a reasonable amount of pressure, which makes such devices generally less suitable for certain individuals. Furthermore, such devices are difficult to actuate using portions of the body other than a finger, such as the palm of the hand, wrist or elbow.

Therefore, there is a desire for a pump-action nozzle device which is:

(i) simple in design;

(ii) utilises less components; and (iii) easy to actuate.

The present invention provides a solution to the problems associated with conventional nozzle devices by providing, in a first aspect, a pump-action nozzle device configured to enable fluid to be dispensed from a container, said nozzle having a body which defines an internal chamber having an inlet through which fluid may be drawn into said chamber and an outlet through which fluid present in the chamber may be expelled from the nozzle, said inlet comprising an inlet valve adapted to only permit fluid to flow into the chamber through the inlet when the pressure within the chamber falls below the pressure within the interior of the container to which the device is attached by at least a predetermined minimum threshold amount and said outlet comprising an outlet valve configured to only permit fluid to flow out of the chamber and be expelled from the nozzle when the pressure within the chamber exceeds the external pressure at the outlet by at least a predetermined threshold amount, wherein at least a portion of the body which defines said chamber is configured to:

(i) resiliently deform from an initial resiliently biased configuration to a distended or deformed configuration in response to the application of a pressure, whereby the volume of said chamber defined by said portion of the body is reduced as said portion of the body is deformed from said initial configuration to said distended or deformed configuration, said reduction in volume causing the pressure within the chamber to increase and fluid to be ejected through the outlet valve; and (ii) subsequently return to its initial resiliently biased configuration when the applied pressure is removed, thereby causing the volume of the chamber to increase and the pressure therein to fall such that fluid is drawn into the chamber through the inlet valve;

characterised in that said nozzle device further comprises an actuator member which extends over at least a portion of said portion of the body and is configured to engage said portion of the body and cause it to deform from its resiliently biased configuration when a pressure is applied to the actuator member.

The nozzle device of the present invention solves the aforementioned problems associated with many conventional pump-action spray nozzle devices by providing a device which is extremely simple in design and which will typically comprise no more than six separate component parts that are fitted together to form the assembled nozzle device. In preferred embodiments the device will comprise no more than three component parts or, more preferably, two separate component parts or, even more preferably, the device is formed from a single, integrally formed component part. By "separate component parts" we mean that the parts are not linked together in any way, i.e. they are not integrally formed with one another (but each separate component part may comprise one or more integral parts or portions). The key to reducing the number of components lies in the formation of the necessary features integrally within the body of the device. For instance, the chamber, inlet, inlet valve, outlet, and outlet valve can all be defined by the body, thereby reducing the need to include separate components with all the consequential increases in component and assembly costs.

The nozzle device of the present invention is further adapted to solve the problems associated with pump-action nozzle devices of simple construction whereby the resiliently deformable portion of the body can, in practice, be extremely difficult to press directly.

The actuator member may be an arm that an operator pushes to cause the said portion of the body to deform. Preferably, however, the actuator member is a over cap that extends over the resiliently deformable portion of the body to form a surface (known as an actuator surface) which can be depressed by an operator in order to cause the resiliently deformable portion of the body defining the chamber to deform and thereby actuate the dispensing of fluid from the chamber of the device. Preferably the surface formed by the cap is a continuous surface.

The actuator member may be configured to flex or otherwise deform when a pressure is applied to its external surface so as to enable the resiliently deformable portion of the body defining the chamber to be deformed from its resiliently biased configuration. Preferably, however, the actuator member is rigid or substantially rigid and does not deform or flex.

In certain preferred embodiments of the invention, the actuator member is slidably mounted to the body of the nozzle device, i.e. it is configured so that it can slide relative to the body of the nozzle device when a pressure is applied, thereby enabling the resiliently deformable portion of the body to be selectively engaged and displaced from its resiliently biased position in response to the application of a pressure to the actuator. In other preferred embodiments of the invention, the handle is pivotally mounted to the body of the device.

Preferably, the actuator is integrally formed with the body. Most preferably, the actuator is linked to the body by a foldable connection element and is configured to pivot about the connection element to enable the said portion of the body to be deformed.

In certain embodiments of the invention the outlet of the nozzle device may be adapted to generate a spray of the fluid ejected from the chamber of the nozzle device. The outlet of the nozzle device may be adapted to perform this function by any suitable means known in the art. For instance, the outlet orifice of the outlet may be a fine hole configured such that fluid flowing through it under pressure is caused to break up into numerous droplets. In such embodiments, however, it is preferable that the outlet comprises an outlet orifice and an outlet passageway that connects the chamber to the outlet orifice. The outlet valve is preferably disposed within the outlet passageway. It is especially preferred that the outlet passageway comprises one or more internal spray-modifying features that are adapted to reduce the size of liquid droplets dispensed through the outlet orifice of the nozzle device during use. Examples of internal spray modifying features that may be present in the outlet passageway include one or more expansion chambers, one or more swirl chambers, one or more internal spray orifices (adapted to generate a spray of fluid flowing through within the outlet passageway), and one or more venturi chambers. The inclusion of one or more of the aforementioned features is known to affect the size of the spray droplets dispensed from the device during use. Specifically, it is known that these features, when present alone or in combination, contribute to the atomisation of the droplets generated. These spray-modifying features, and the effect that they impart on the properties of the spray produced, are known in the art and are described in, for example, International Patent Publication Number WO 01/89958, the entire contents of which are incorporated herein by reference. It shall be appreciated that the provision of the outlet valve upstream from the outlet passageway and the outlet orifice ensures that the fluid enters the outlet passageway with sufficient force for the liquid to be broken up into droplets and form a spray.

In certain embodiments of the invention, the outlet passageway and outlet orifice may be in the form of a separate unit or insert, which can be connected to the outlet of the chamber to form the outlet of the nozzle device. The unit or insert may also be connected to the body of the device by a hinge so as to enable it to be optionally swung into the required position for use and swing out of position when it is not required.

In alternative embodiments of the invention, the liquid present in the chamber may be dispensed as a stream of liquid which is not broken up into droplets. Examples of such liquids dispensed in this form include soaps, shampoos, creams and the like.

Alternatively, the fluid dispensed may be a gas or mixture of gasses, such as air, for example.

The Body of the Nozzle Device

The chamber defined by the body may be defined between two or more interconnected parts of the body. It is especially preferred that the chamber of the nozzle device is defined between two interconnected parts, which may be separately formed component parts that fit together to define the chamber or, more preferably, the two parts will be integrally formed with one another as a single component. In the latter case, it is preferred that the two parts are connected together by hinge or foldable connection element which enables the two parts to be moulded together in the same mould and then brought into contact with one another to define the chamber.

In preferred embodiments of the invention in which the outlet comprises the outlet valve, an outlet orifice and an outlet passageway that connects the outlet valve to the outlet orifice, it is also preferred that the at least two interconnected parts that define the chamber also define at least a portion of the outlet passageway. Most preferably, the two interconnected parts also form the outlet valve between them and also define the entire outlet passageway, together with the outlet orifice.

The outlet passageway is preferably defined between an abutment surface of one of said parts and an opposing abutment surface of another of said parts. One or more of the abutment surfaces preferably comprises one or more grooves and/or recesses formed thereon which define the outlet passageway when the abutment surfaces are contacted together. Most preferably, each of said abutment surfaces comprises a groove and/or recesses formed thereon which align to define the outlet passageway when the abutment surfaces are contacted together. The grooves and/or recesses preferably extend from the chamber to an opposing edge of the abutment surfaces where, when the abutment surfaces are contacted together, an outlet orifice is defined at the end of the outlet passageway. In preferred embodiments where one or more spray modifying features are present in the outlet passageway, the features may be formed by aligning recesses or other formation formed on the abutment surfaces, as illustrated and described in International Patent Publication Number WO 01/89958.

The two parts of the body may be permanently fixed together by, for example, ultrasonically welding or heat welding. If the base and upper part are to be moulded or welded together, then it is preferable that they are made from compatible materials. As previously indicated above, however, it is preferable that the body if formed from a single material.

Alternatively, the two parts may be configured to fit tightly/resistively to one another to form the nozzle (e.g. by the provision of a snap-fit connection) in the absence of any welding. For instance, the edges of one part may be configured to fit into a retaining groove of the other part to form the nozzle device.

As a further alternative, a compatible plastic material may be moulded over the join of the two parts to secure them together. This can be achieved by moulding the two components simultaneously in a tool, joining them together in the tool to form the dispenser nozzle device and then moulding a suitable plastic material around them to hold the two parts together.

In certain embodiments, the two parts may remain releasably attached to one another so that they can be separated during use to enable the chamber and/or the outlet to be cleaned.

It is most preferred that the two parts of the body of the nozzle device that define the chamber are a base part and an upper part. The base part is preferably adapted to be fitted to the opening of a container by a suitable means, such as, for example, a screw thread or snap fit connection. Furthermore, in addition to forming a portion of the body that defines the chamber, the base part also preferably defines the inlet as well as a portion of the outlet passageway leading from the chamber to the outlet orifice in preferred embodiments.

The upper part is adapted to be fitted to the base so that between them they define the chamber and, in preferred embodiments, the outlet valve, outlet passageway and/or outlet orifice. In certain preferred embodiments of the invention, the base and upper part also define the outlet orifice. It is also preferred that the upper part forms the resiliently deformable portion of the body defining the chamber.

As previously mentioned above, the actuator member may be a separate component part that is fitted to the body of the nozzle device, but it is preferred that it is integrally formed with one of the component parts of the body.

Material

The body of the nozzle arrangement may be made from any suitable material. In preferred embodiments where the body comprises two interconnected parts which fit together to define the chamber, the two parts may be made from either the same or different materials. For instance, one of the parts may be made from a flexible/resiliently deformable material, such as a resiliently deformable plastic or rubber material, and the other of said parts may be made from a rigid material, such as a rigid plastic. Such embodiments are preferred for some applications because the flexible/resiliently deformable material forms the resiliently deformable portion of the body defining the chamber and can readily be depressed by an operator to actuate the ejection of fluid present in the chamber in the form of a spray. The flexible/resiliently deformable material can also provide a soft touch feel for the operator. Preferably, the base part will be formed from a rigid plastic and the upper part will be formed from a resiliently deformable material. Such embodiments can be made by either moulding the two parts separately and then connecting them together to form the assembled nozzle arrangement, or moulding the two parts in the same tool using a bi-injection moulding process. In the latter case, the two parts could be moulded simultaneously and then fitted together within the moulding tool or, alternatively, one part could be moulded first from a first material and the second part made from a second material could be moulded directly onto the first part.

Alternatively, the two parts may both be made from either a rigid or a flexible material. The rigid and flexible material may be any suitable material from which the nozzle device may be formed. For instance, it may be formed from metallic material such as aluminium foil or a flexible material such as rubber. Preferably, however, the body of the device is formed entirely from a rigid plastic material or a flexible plastic material.

The actuator member may be formed from any suitable material. Preferably it is formed from a rigid plastic material and, most preferably, it is integrally formed with the base of the device.

The entire pump-action nozzle device (i.e. the body and the actuator) is preferably formed from a single rigid or flexible plastic material.

The expression "rigid plastic material" is used herein to refer to a plastic material that possesses a high degree of rigidity and strength once moulded into the desired form, but which can also be rendered more flexible or resiliently deformable in portions by reducing the thickness of the plastic. Thus, a thinned section of plastic can be provided to form the at least a portion of the body that defines the chamber and which is configured to resiliently deform.

The term "flexible plastic" is used herein to denote plastics materials which are inherently flexible/resiliently deformable so as to enable the resilient displacement of at least a portion of the body to facilitate the compression of the chamber. The extent of the flexibility of the plastic may be dependent on the thickness of the plastic in any given area or region. Such "flexible plastic" materials are used, for example, in the preparation of shampoo bottles or shower gel containers. In the fabrication of a nozzle device of the present invention, portions of the body may be formed from thicker sections of plastic to provide the required rigidity to the structure, whereas other portions may be composed of thinner sections of plastic to provide the necessary deformability characteristics. If necessary, a framework of thicker sections, generally known as support ribs, may be present if extra rigidity is required in certain areas.

Forming the entire nozzle device from a single plastic material means that it can be moulded in a single tool in a single moulding operation, as discussed further below.

The formation of the nozzle device from a single material, particularly in preferred embodiments where the two parts are integrally formed and connected to one another by a foldable connection element or a hinged joint so that the upper part can be swung into contact with the base part to form the assembled nozzle device, avoids the requirement for the assembly of multiple, separate component parts. Furthermore, forming the nozzle device from a single material provides the possibility of welding the two parts together (e.g. by heat or ultrasonic welding) or, if the plastic material is a rigid plastic material, then a snap-fit connection can be formed between the upper part and the base. The latter option also enables the upper part and base to be disconnected periodically for cleaning.

For most applications the nozzle device would need to be made from a rigid material to provide the necessary strength and enable the two-parts to be either snap fitted or welded together. In such cases, the deformable portion of the body tends to deform only when a certain minimum threshold pressure is applied and this makes the pump action more like the on/off action associated conventional pump-action nozzle devices. However, in certain applications, a flexible material may be preferred.

The portion of the body configured to resiliently deform could be a relatively thin section of a rigid plastic material which elastically deforms to compress the chamber when a pressure is applied and then subsequently returns to its initial resiliently biased configuration when the applied pressure is removed. Alternatively, the portion of the body concerned may comprise a substantially rigid portion surrounded by a deformable portion such that pressure applied to the rigid portion causes the surrounding resiliently deformable portion to deform and thereby enables the rigid portion to be displaced to compress the chamber. For example, the surrounding resiliently deformable portion could resemble a bellows, i.e. a rigid portion is surrounded by a deformable side wall that comprises a number of folded segments of rigid plastic which is configured such that applying a pressure to the rigid portion causes the folds of the sidewall to resiliently compress together to reduce the volume of the chamber. Once the applied pressure is removed, the side walls return to their original configuration.

In most cases, however, it is preferable that the abutment surfaces that define the outlet passageway of the outlet are formed from a rigid plastic material. Although flexible/resiliently deformable materials could be used for this purpose they are generally less preferred because any spray-modifying features present will typically need to be precisely formed from a rigid material. Thus, in some embodiments of the invention, one of the two parts that defines the outlet and the chamber may be formed from two materials, namely a rigid material that forms the abutment surface that defines the outlet passageway and the outlet orifice, and a resiliently deformable material that defines the chamber.

Outlet Valve

In order to function optimally, it is necessary that the outlet of the chamber is provided with, or is adapted to function as, a one-way valve.

Any suitable pressure-sensitive one-way valve assembly that is capable of forming an airtight seal may be provided in the outlet.

However, it is preferable that the valve is formed by the component parts of the body of the nozzle device. Most preferably, the valve is formed between the abutment surfaces that define outlet passageway.

In certain preferred embodiments of the invention, the outlet valve may comprise a valve member which is received within a valve seat to close off the outlet of the nozzle device. The valve member may be configured such that the actuation of the device causes the valve member to be physically or mechanically removed from the valve seat when the device is actuated. For instance, the resiliently deformable portion could be configured in such a way that when it deforms from its resiliently biased configuration the valve member becomes displaced form the valve seat. The valve will closed at all other time to prevent air being drawn back into the chamber through the outlet.

In alternative preferred embodiments of the device, the one-way valve is configured to only permit fluid present in the chamber to be dispensed through the outlet only when a predetermined minimum threshold pressure is achieved within the chamber (as a consequence of the reduction in the volume of the internal chamber caused by the displacement of the resiliently deformable wall from its initial resiliently biased configuration), and closes the outlet at all other times to form an airtight seal. The closure of the valve when the pressure in the chamber is below a predetermined minimum threshold pressure again prevents air being sucked back through the outlet into the chamber when the applied pressure to the resiliently deformable portion of the body is released and the volume of the chamber increases as the resiliently deformable wall re-assumes its initial resiliently biased configuration.

In certain embodiments of the invention, the outlet valve is formed by one of the abutment surfaces being resiliently biased against the opposing abutment surface to close off a portion of the length of the outlet passageway. In this regard, the valve will only open to permit fluid to be dispensed from the chamber when the pressure within the chamber is sufficient to cause the resiliently biased abutment surface to deform away from the opposing abutment surface and thereby form an open channel through which fluid from the chamber can flow. Once the pressure falls below a predetermined minimum threshold value, the resiliently biased surface will return to its resiliently biased configuration and close off the passageway.

In certain embodiments of the invention, it is especially preferred that the resiliently biased abutment surface is integrally formed with the resiliently deformable portion of the body, which defines the chamber.

In embodiments where the body is made entirely from a rigid plastic material, the resistance provided by the resiliently biased surface, which will be a thin section of rigid plastic) may not be sufficiently resilient to achieve the required minimum pressure threshold for the optimal functioning of the device. In such cases, a thickened rib of plastic, which extends across the passageway, may be formed to provide the necessary strength and resistance in the outlet passageway/valve. Alternatively, a rigid reinforcing rib could be provided above part of the outlet passageway/valve.

In an alternative preferred embodiment, the outlet/precompression valve is formed by a resiliently deformable member formed on one of said abutment surfaces which extends across the outlet passageway to close off and seal the passageway. The member is mounted to the device along one of its edges and has another of its edges (preferably the opposing edge) free, the free end being configured to displace when the pressure within the chamber exceeds a predetermined minimum threshold value. The free end abuts a surface of the outlet channel to form a seal therewith when the pressure is below the predetermined minimum threshold value. However, when the pressure exceeds the predetermined minimum threshold value, the free end of the member is displaced from the abutment surface of the channel to form an opening through which the fluid present in the chamber can flow to the outlet. Preferably, the resiliently deformable member is positioned within a chamber formed along the length of the outlet channel or passageway. Most preferably, the abutment surface, which forms the seal with the free end of the member at pressures below the minimum threshold, is tapered or sloped at the point of contact with the free end of the member. This provides a point seal contact and provides a much more efficient seal. It will of course be appreciated that the slope or taper of the abutment surface must be arranged so that the free end of the resiliently deformable member contacts the slope when the pressure within the chamber is below the predetermined minimum threshold, but distends away from it when the predetermined minimum threshold is exceeded.

Alternatively, the valve may be a post or plug formed on the abutment surface of one of the base or upper parts and which contacts the opposing abutment surface to close off and seal the passageway. The post or plug will be mounted to a deformable area of the base or upper part so that when the pressure within the chamber exceeds a predetermined threshold value, the post or plug can be deformed to define an opening through which fluid can flow through the outlet.

The predetermined minimum pressure that must be achieved within the chamber in order to open the outlet valve will depend on the application concerned. A person skilled in the art will appreciate how to modify the properties of the resiliently deformable surface by, for example, the selection of an appropriate resiliently deformable material or varying the manner in which the surface is fabricated (e.g. by the inclusion of strengthening ridges).

Inlet Valve

To ensure that fluid is only ejected through outlet when the chamber is compressed by displacing the resiliently deformable portion of the body into the chamber from its initial resiliently biased configuration, it is necessary to provide a one-way inlet valve disposed at or in the inlet of the nozzle device.

Any suitable inlet valve may be used.

The inlet valve may be adapted to only open and permit fluid to flow into the chamber when the pressure within the chamber falls below a predetermined minimum threshold pressure (as is the case when the pressure applied to the resiliently deformable portion of the chamber to compress the chamber is released and the volume of the chamber increases as the resiliently deformable portion reassumes it's initial resiliently biased configuration). In such cases, the inlet valve may be a flap valve which consists of a resiliently deformable flap positioned over the inlet opening. The flap is preferably resiliently biased against the inlet opening and adapted to deform so as to allow fluid to be drawn into the chamber through the inlet when the pressure within the chamber falls below a predetermined minimum threshold pressure. At all other times, however, the inlet will be closed, thereby preventing fluid flowing back from the chamber into the inlet. It is especially preferred that the resiliently deformable flap is formed as an integral extension of the resiliently deformable portion of the body which defines the chamber. It is also especially preferred that the base defines the inlet and the resiliently deformable portion of the body is formed by the upper part. It is therefore the preferred that the upper part comprises the resiliently deformable flap that extends within said chamber to cover the inlet opening to the chamber and form the inlet valve.

Alternatively, the flap may not be resiliently biased against the inlet opening and may instead be disposed over the inlet opening and configured such that it is pressed against the inlet only when the chamber is compressed and the pressure therein increases.

Problems can arise, however, with the simple provision of a flap valve that is resiliently biased over the inlet opening. Specifically, over time the elastic limit of the material from which the flap is formed may be exceeded, which may cause it to not function properly. This problem applies particularly to embodiments of the invention in which the flap is formed from a thin section of a rigid material, although it also applies to a lesser extent to flexible materials and can occur due to deformation of the flap when the chamber is compressed, as well as when the flap deforms to open the valve. As a consequence, fluid could leak from the chamber back into the container through the inlet.

For these reasons it is preferable that flap valve comprises a number of adaptations. In particular, it is preferred that the inlet has a raised lip extending around the inlet orifice that the resiliently deformable flap abuts to create a tight seal around the inlet. The provision of a lip ensures a good contact is obtained with the flap. In embodiments where the lip is very small it may be necessary to provide one or more additional support ribs at either side of the inlet opening to ensure that a proper seal is formed and to also prevent the lip from damage.

A further preferred feature is that the flap possesses a protrusion or plug formed on its surface. The protrusion or plug extends a short way into the inlet opening and abuts the side edges to further enhance the seal formed.

It is also preferred that the inlet opening to the chamber is disposed at an elevated position within the chamber so that fluid flows into the chamber through the inlet and drops down into a holding or reservoir area. This prevents fluid resting on the top of the inlet valve over prolonged periods by effectively distancing the inlet opening from the main fluid holding/reservoir area of the chamber and thereby reduces the likelihood of any leaks occurring over time.

It is also preferred that a second reinforcing flap or member contacts the opposing surface of the resiliently deformable flap to urge it into tight abutment with the inlet opening. It is also preferred that the second reinforcing flap contact the opposing surface of the resiliently deformable flap at or close to the portion of the opposing surface that covers the inlet orifice to maximise the vertical pressure of the main flap over the hole. Again this helps to maintain the integrity of the seal.

Lock

The nozzle device may also be provided with a locking means to prevent the fluid being dispensed accidentally.

In such embodiments the lock will be integral part of the body and will not be a separate component connected to the body. For instance, the locking means may be hinged bar or member that is integrally connected to a part of the body (e.g. either the base or upper part) and which can be swung into a position whereby the bar or member prevents the outlet valve from opening.

The locking means may be provided between the actuator member and the body of the nozzle device. In embodiments where the actuator member is an over cap slidably mounted to the body, locking detents may be provided on the body and the over cap which can be selectively engaged to lock the position of the over cap relative to the body. The detents could be selectively engaged by, for example, twisting the over cap into a locked position.

In embodiments where the actuator member is pivotally mounted to the body of the device, the locking means may be a hinged member fitted to the actuator member or the body of the device which can be moved into a position whereby it engages the body of the device of the actuator member respectively, to prevent the actuator member pivoting when a pressure is applied and, hence, compressing the internal chamber.

Air Release/Leak Valve

The device may further comprise an air leak through which air can flow to equalise any pressure differential between the interior of the container and the external environment. In some cases, the air leak may simply occur through gaps in the fitting between the dispenser nozzle and the container, but this is not preferred because leakage may occur if the container is inverted or shaken. In preferred embodiments, the dispenser nozzle further comprises an air leak valve, i.e. a one-way valve that is adapted to permit air to flow into the container, but prevents any fluid leaking out of the container if it is inverted. Any suitable one-way valve system would suffice. It is preferred, however, that the air leak valve is integrally formed within the body of the dispenser or, more preferably, between two component parts of the body of the dispenser.

Most preferably, the air leak valve is formed between the upper part and base which define the chamber of the dispenser nozzle.

Preferably, the air leak valve comprises a valve member disposed within a channel that is defined by the body of the device and connects the interior of the fluid supply to the external environment. Most preferably, the valve member is resiliently biased so as to contact the sides of the channel and forms a sealing engagement therewith to prevent any liquid from leaking out of the container, the valve member being further adapted to either resiliently deform or displace from the sealing engagement with the sides of the channel to define an opening through which air can flow into the container when pressure within the container falls below the external pressure by at least a minimum threshold amount. Once the pressure differential between the interior and the exterior of the container has been reduced to below the minimum threshold pressure, the valve member returns to it position in which the channel is closed.

Preferably, the valve member is in the form of a plunger that extends into the channel and comprises an outwardly extending wall that abuts the sides of the channel to form a seal. Preferably, the outwardly extending wall is additionally angled towards the interior of the container. This configuration means that a high pressure within the container and exerted on the wall of the valve member will cause the wall to remain in abutment with the sides of the channel. Thus, the integrity of the seal is maintained thereby preventing liquid from leaking out through the valve. Conversely, when pressure within the container falls below the external pressure by at least a minimum threshold amount, the wall is deflected away from the sides of the container to permit air to flow into the container to equalise or reduce the pressure differential.

It is especially preferred that the plunger is mounted on to a deformable base or flap which is capable of some movement when the dome is pressed to displace any residue that may have accumulated in the air leak valve. In addition, the provision of a moveable (e.g. resiliently deformable) element within the air leak valve is preferred because it helps to prevent the valve becoming clogged during use.

In certain embodiments of the invention it is also preferred that a protective cover is provided over the opening of the female tube on the internal surface of the device to prevent liquid present in the interior of the container from contacting the valve member with a high or excessive force when the container is inverted or shaken aggressively. The cover will allow air and some fluid to flow past, but will prevent fluid impacting on the seal formed by the flared end of the plunger directly, and thus will prevent the seal being exposed to excessive forces.

In an alternative embodiment, the channel of the air leak valve may be resiliently deformable instead of the male part. This arrangement can be configured so that the side walls of the channel distort to permit air to flow into the container.

The valve member and channel could be made from the same material or different materials. For instance, they may both be made from a semi-flexible plastic or the female element may be made from a rigid plastic and the male part made from a resiliently deformable material.

With certain products stored in containers over time there is a problem associated with gas building up inside the bottle over time. To release the build up of pressure, which can inevitably occur, a release valve is required. The air leak valve described above can be modified to additionally perform this function by providing one or more fine grooves in the side of the channel. These fine groove(s) will permit gas to slowly seep out of the container, by-passing the seal formed by the contact of the valve member with the sides of the channel, but prevent or minimise the volume of liquid that may seep out. Preferably, the groove or grooves formed in the side walls of the channel is/are formed on the external side of the point of contact between the valve member and the sides of the channel so that it/they are only exposed when the pressure inside the container increases and acts on the plunger to cause it to deform outwards (relative to the container). The plunger will return to its resiliently biased position in which the grooves are not exposed once any excess gas has been emitted. No liquid product should be lost during this process.

Alternatively, the gas pressure within the container could urge the valve member outwards so that it is displaced from the channel and defines an opening through which the gas could flow.

Seal

In preferred embodiments of the invention comprising at least two component parts, it is preferred that a seal is disposed at the join between the at least two interconnected parts to prevent any fluid leaking out of the dispenser nozzle. Any suitable seal would suffice. For instance, the two parts could be welded to one another or one part could be configured to snap fit into a sealing engagement with the other part or have possess a flange around its perimeter that fits tightly around the upper surface of the other part to form a seal therewith.

Preferably, the seal comprises a male protrusion formed on the abutment surface of one of the at least two parts that is received in a sealing engagement with a corresponding groove formed on the opposing abutment surface of the other part when the two parts are connected together.

The seal preferably extends around the entire chamber and the sides of the outlet passageway so that fluid leaking from any position within the chamber and or outlet passageway is prevented from seeping between the join between the two component parts. In certain embodiments where the outlet orifice is not defined between the two component parts of the body, it is preferred that the seal extends around the entire chamber and any portion of the outlet that is defined between the two interconnected parts of the body.

In certain embodiments that comprise an outlet passageway the protrusion member may extend across the passageway and form the resiliently deformable valve member of the outlet valve. This portion of the protrusion will usually be thinner to provide the necessary resilience in the valve member to permit it to perform its function.

In certain embodiments of the invention, the male protrusion may be configured to snap fit into the groove or, alternatively, the male protrusion may be configured to resistively fit into the groove in a similar manner to the way in which a plug fits into the hole of a sink.

Dip Tube

In most cases, a dip tube may be integrally formed with the dispenser, or alternatively the body of the dispenser may comprise a recess into which a separate dip tube can be fitted. The dip tube enables fluid to be drawn from deep inside the container during use and thus, will be present in virtually all cases.

Alternatively, it may be desirable with some containers, particularly small volume containers, such as glues, perfume bottles and nasal sprays, to omit the dip tube, because the device itself could extend into the container to draw the product into the dispenser nozzle during use, or the container could be inverted to facilitate the priming of the dispenser with fluid. Alternatively, the device may further comprise a fluid compartment formed as an integral part of device from which fluid can be drawn directly into the inlet of the nozzle without the need for a dip tube.

Internal Chamber

The chamber of the nozzle device may be of any form and it shall of course be appreciated that the dimensions and shape of the chamber will be selected to suit the particular device and application concerned. Similarly, all the fluid in the chamber may be expelled when the chamber is compressed or, alternatively, only a proportion of the fluid present in the chamber may be dispensed, again depending on the application concerned.

In certain preferred embodiments of the invention, the chamber is defined by a generally dome-shaped resiliently deformable region of the body. Preferably, the dome-shaped region is formed on the upper surface of the body so that it is accessible for engagement by an engagement portion of the actuator member that is fitted to the body.

One problem with dome-shaped chambers can be that a certain amount of dead space exists within the chamber when it is compressed, and for some applications it will be preferable that the dead space is minimised or virtually negligible. To achieve this, it has been found that flattened domes or other shaped chambers whereby the resiliently deformable wall of chamber can be depressed such that it contacts an opposing wall of the chamber and thereby expels all of the contents present therein are generally preferred. For this reason, a flattened dome is especially preferred because it reduces the extent with which the dome needs to be pressed inwards in order to compress the chamber and actuate the dispensing of fluid stored therein. It also reduces the number of presses required to prime the chamber ready for the first use.

In some cases, the resiliently deformable portion of the body may not be sufficiently resilient to retain its original resiliently biased configuration following deformation. This may be the case where the fluid has a high viscosity and hence tends to resist being drawn into the chamber through the inlet. In such cases, extra resilience can be provided by the positioning of one or more resiliently deformable posts within the chamber, which bend when the chamber is compressed and urge the deformed portion of the body back to its original resiliently biased configuration when the applied pressure is removed. Alternatively, one or more thickened ribs of plastic could extend from the edge of the resiliently deformable area towards the middle of this portion. These ribs will increase the resilience of the resiliently deformable area by effectively functioning as a leaf spring which compresses when a pressure is applied to the resiliently deformable portion of the body, and urges this portion back to its initial resiliently biased configuration when the applied pressure is removed.

Yet another alternative is that a spring or another form of resilient means is disposed in the chamber. As above, the spring will compress when the wall is deformed and, when the applied pressure is removed, will urge the deformed portion of the body to return to its original resiliently biased configuration and, in doing so, urges the compressed chamber back into its original "non-compressed configuration".

Two or More Chambers

The nozzle device of the invention may comprise two or more separate internal chambers.

Each individual chamber may draw fluid into the nozzle device through a separate inlet from different fluid sources, e.g. separate fluid-filled compartments within the same container.

Alternatively, one or more of the additional chambers may not comprise an inlet. Instead a reservoir of the second fluid may be stored in the chamber itself and the additional chamber or its outlet may be configured to only permit a predetermined amount of the second fluid to be dispensed with each actuation.

As a further alternative, one or more chambers of the additional chambers may draw air in from outside the nozzle device. Whether the additional chamber or chambers contain air or some other fluid drawn from a separate compartment within the container, the contents of the two or more chambers can be ejected simultaneously through the outlet by simultaneously compressing both chambers together. The contents of the respective chambers will then be mixed within the outlet, either on, after or prior to, ejection from the nozzle device. It shall be appreciated that varying the relative volumes of the separate chambers and/or the dimensions of the outlet can be used to influence the relative proportions of constituents present in the final mixture expelled through the outlet. Furthermore, the outlet passageway may be divided into two or more separate channels, each channel extending from a separate chamber, and each separate channel may feed fluid into a spray nozzle passageway as discussed above where it is mixed prior to ejection.

Where an additional chamber for the expulsion of air is present, it shall be appreciated that, once the expulsion of air is complete and the applied pressure is removed thereby allowing the chamber to deform back to its original expanded configuration, more air needs to be drawn into the chamber to replenish that expelled. This can be achieved by either sucking air back in through the outlet (i.e. not providing this additional chamber with an airtight outlet valve) or, more preferably, drawing air in though an inlet hole in the body defining the chamber. In the latter case, the inlet hole is preferably provided with a one-way valve similar to the inlet valve discussed above. This valve will only permit air to be drawn into the chamber and will prevent air being expelled back through the hole when the chamber is compressed.

In most cases, it is desirable to co-eject the air and fluid from the container at approximately the same pressure. This will require the air chamber to be compressed more (e.g. 3-200 times more—depending on the application concerned) than the fluid/liquid-containing chamber. This may be achieved by positioning the chambers so that, when a pressure is applied, the compression of the air-containing chamber occurs preferentially, thereby enabling the air and liquid to be ejected at the same or substantially the same pressure. For example, the air-containing chamber may be positioned behind the liquid-containing chamber so that, when a pressure is applied, the air chamber is compressed first until a stage is reached when both chambers are compressed together.

As an alternative, the nozzle device may also be adapted in such a way that the air pressure may be higher or lower than the liquid pressure, which may be beneficial for certain applications.

The chambers may be arranged side by side or one chamber may be on top of another. In a preferred embodiment where one of the additional chambers contains air, the additional air chamber is positioned relative to the chamber of the nozzle device so that the compression of the air chamber causes the resiliently deformable portion of the body to deform and compress the chamber of the nozzle device.

Preferably, the fluid present in each chamber are ejected simultaneously. However, it shall be appreciated that one chamber may eject its fluid before or after another chamber in certain applications.

In alternative embodiments, air and fluid from the container may be present in a single chamber, rather than separate chambers. In such cases, fluid and air is co-ejected and may be mixed as it flows through the outlet. For example, where the outlet comprises an expansion chamber, i.e. a widened chamber positioned in the outlet passageway, the contents ejected from the chamber could be split into separate branches of the channel and enter the expansion chamber at different locations to encourage mixing.

Integrally Formed with Container

In most cases it is preferable that the nozzle device is adapted to be fitted to container by some suitable means, e.g. a snap fit or a screw thread connection. In certain cases, however, the nozzle device could be incorporated into a container as an integral part. For instance, the nozzle device could be integrally moulded with various forms of plastic container, such as rigid containers or bags. This is possible because the device is preferably moulded as a single material and, therefore, can be integrally moulded with containers made from the same or a similar compatible material.

According to a second aspect of the present invention, there is provided a container having a pump-action nozzle device as hereinbefore defined fitted to an opening thereof so as to enable the fluid stored in the container to be dispensed from the container through said nozzle device during use.

According to a third aspect of the present invention, there is provided a container having a pump-action nozzle device as hereinbefore defined integrally formed therewith so as to enable the fluid stored in the container to be dispensed from the container through said nozzle device during use.

According to a fourth aspect of the present invention, there is provided a pump-action nozzle device configured to enable fluid to be dispensed from a container, said nozzle having a body which defines an internal chamber having an inlet through which fluid may be drawn into said chamber and an outlet through which fluid present in the chamber may be expelled from the nozzle, said inlet comprising an inlet valve adapted to only permit fluid to flow into the chamber through the inlet when the pressure within the chamber falls below the pressure within the interior of the container to which the device is attached by at least a predetermined minimum threshold amount and said outlet comprising an outlet valve configured to only permit fluid to flow out of the chamber and be expelled from the nozzle when the pressure within the chamber exceeds the external pressure at the outlet by at least a predetermined threshold amount, wherein at least a portion of the body which defines said chamber is configured to:

(i) be displaceable from an initial resiliently biased configuration to a distended or deformed configuration in response to the application of a pressure, whereby the volume of said chamber defined by said portion of the body is reduced as said portion of the body is deformed from said initial configuration to said distended or deformed configuration, said reduction in volume causing the pressure within the chamber to increase and fluid to be ejected through the outlet valve; and (ii) subsequently return to its initial position when the applied pressure is removed, thereby causing the volume of the chamber to increase and the pressure therein to fall such that fluid is drawn into the chamber through the inlet valve;

characterised in that said nozzle device further comprises an actuator member which extends over at least a portion of said portion of the body and is configured to engage said portion of the body and cause it to deform from its resiliently biased configuration when a pressure is applied to the actuator member.

Preferably the nozzle device is as defined above.

In addition, it is also preferable, the part of the body that can be displaced inwards to reduce the volume of the chamber and thereby cause fluid present in said chamber to be ejected through the outlet is a piston mounted within a piston channel. The piston channel may form the entire chamber or, alternatively, just a portion thereof.

Preferably, the nozzle device comprises a means for displacing the piston inwards from its initial position and then subsequently returning it is initial position. This may be achieved by any suitable means, such as, for example, a trigger or over cap connected to the piston which can be operated to displace the piston, when desired. Preferably, the actuator member is resiliently biased to retain said portion of the body in its initial position in the absence of any applied pressure.

Method of Manufacture

The nozzle devices of the present invention may be made by any suitable methodology know in the art.

As previously described, preferred embodiments of the invention comprise a body having two parts (a base and upper part) which fit together to define at least the chamber of the device and, more preferably, the chamber and at least a portion of the outlet. In addition, the device comprises an actuator member.

According to a further aspect of the present invention, there is provided a method of manufacturing a nozzle device as hereinbefore defined, said nozzle device having a body composed of at least two interconnected parts and having an actuator member fitted thereto, said method comprising the steps of:

(i) moulding said parts of the body and said actuator member;

(ii) connecting said parts of the body together to form the body of the nozzle device; and (iii) fitting the actuator member to the body of the nozzle device.

Each part of the body and the actuator member may be a separate component part, in which case the component parts are initially formed and then assembled together to form the nozzle device. Each component part may be made from the same or a different material.

Alternatively, and more preferably, the two parts of the body or one of the parts of the body and the actuator member may be integrally formed with one another and connected by a bendable/foldable connection element. In such cases the connected parts are formed in a single moulding step and then assembled together with the remaining part to form the nozzle device. For instance, the base and upper part of the preferred embodiments of the device may be integrally formed and connected to one another by a foldable/bendable connection element. Once formed, the upper part can be folded over and connected to the base to form the assembled nozzle device. The actuator member may then be fitted to the body of the nozzle device as a separate component.

In especially preferred embodiments of the invention, the device is formed from a single component part, which comprises the two parts of the body and the actuator member, all integrally formed with one another and connected to one another by foldable/bendable connection elements. Thus, the entire device is formed in a single moulding step from a single material. Once formed, the two parts forming the chamber of the device can be connected together and the actuator member can then be connected into a position whereby it extends across the resiliently deformable portion of the body.

It shall be appreciated that integrally formed component parts are preferably formed from the same material in single moulding step.

As an alternative, the nozzle device may be formed as a bi-injection moulding whereby a first component part of the body is formed from a first material and a second part of the body formed from the same or a different material is moulded onto the first part. Again, the actuator member may be a separate component part that is then fitted to the body of the nozzle device, or it may be integrally formed with one of the part of the body According to a further aspect of the present invention, there is provided a method of manufacturing a nozzle device as hereinbefore defined, said nozzle device having a body composed of at least two interconnected parts and having an actuator member fitted thereto, said method comprising the steps of:

(i) moulding a first of said parts of the body in a first processing step;

(ii) over-moulding the second of said parts onto the first of said parts in a second processing step to form the body of the nozzle device; and (iii) connecting the actuator member to the body of the nozzle device.

The at least two parts are preferably moulded within the same moulding tool. Usually the first part will be the base part of the nozzle device and the second part will be the upper part.

According to a further aspect of the present invention, there is provided a method of manufacturing a nozzle device as hereinbefore defined, said nozzle device having a body composed of at least two interconnected parts and having an actuator member fitted thereto, said method comprising the steps of:

(i) moulding a first of said parts of the body in a first processing step together with a framework or base for a second of said parts; and (ii) over-moulding a second plastic material onto the framework or base to form the second of said parts of the assembled nozzle device; and (iii) connecting the actuator member to the body of the nozzle device.

It is especially preferred that the base is moulded first from a rigid plastic material together with the framework support for the upper part. The framework for the upper part is preferably connected to the base by a hinged or foldable connection member, which enables the framework to be folded over and fitted to the base during the assembly of the final product. The framework is over moulded with a compatible flexible, resiliently deformable plastic material which forms the resiliently deformable portion of the body that defines the chamber. The resiliently deformable plastic material may also form resiliently deformable valve members for the outlet valve and the inlet valve. It may also extend over other parts of the nozzle surface to provide a soft-touch feel to the device when an operator grips it. The rigid framework of the upper part may form an outer edge of the upper part, which forms the point of connection with the base and, in embodiments where a spray nozzle passageway is present, the framework may also form an upper abutment surface which contacts a lower abutment surface formed the base to define the spray passageway and outlet orifice.

According to a further aspect of the present invention, there is provided a method of manufacturing a nozzle device as hereinbefore defined, said nozzle device having a body composed of at least two interconnected parts and having an actuator member fitted thereto, wherein said parts and said actuator member are connected to one another by a connection element such that said parts are moveable relative to one another, said method comprising the steps of:

(i) moulding the parts of the body and the actuator member together with said connection elements in a single moulding step;

(ii) moving said part of the body into engagement with one another to form the body of the nozzle device; and (iii) moving the actuator member into engagement with the body to form the nozzle device.

Blowing Agent

Preferably, a blowing agent is incorporated into the mould together with the plastic material. The blowing agent produces bubbles of gas within the moulded plastic that prevent the occurrence of a phenomenon known as sinkage from occurring. The problem of sinkage and the use of blowing agents in the manufacture of blowing agents to address this problem is described further in the applicant's co-pending International Patent Publication No. WO03/049916, the entire contents of which are incorporated herein by reference.

BRIEF DESCRIPTION OF THE DRAWINGS

How the invention may be put into practice will now be described by way of example only, in reference to the following drawings, in which.

In the following description of the figures, like reference numerals are used to denote like or corresponding parts in different figures, where appropriate.

DESCRIPTION OF THE PREFERRED EMBODIMENTS

Figure 1A:
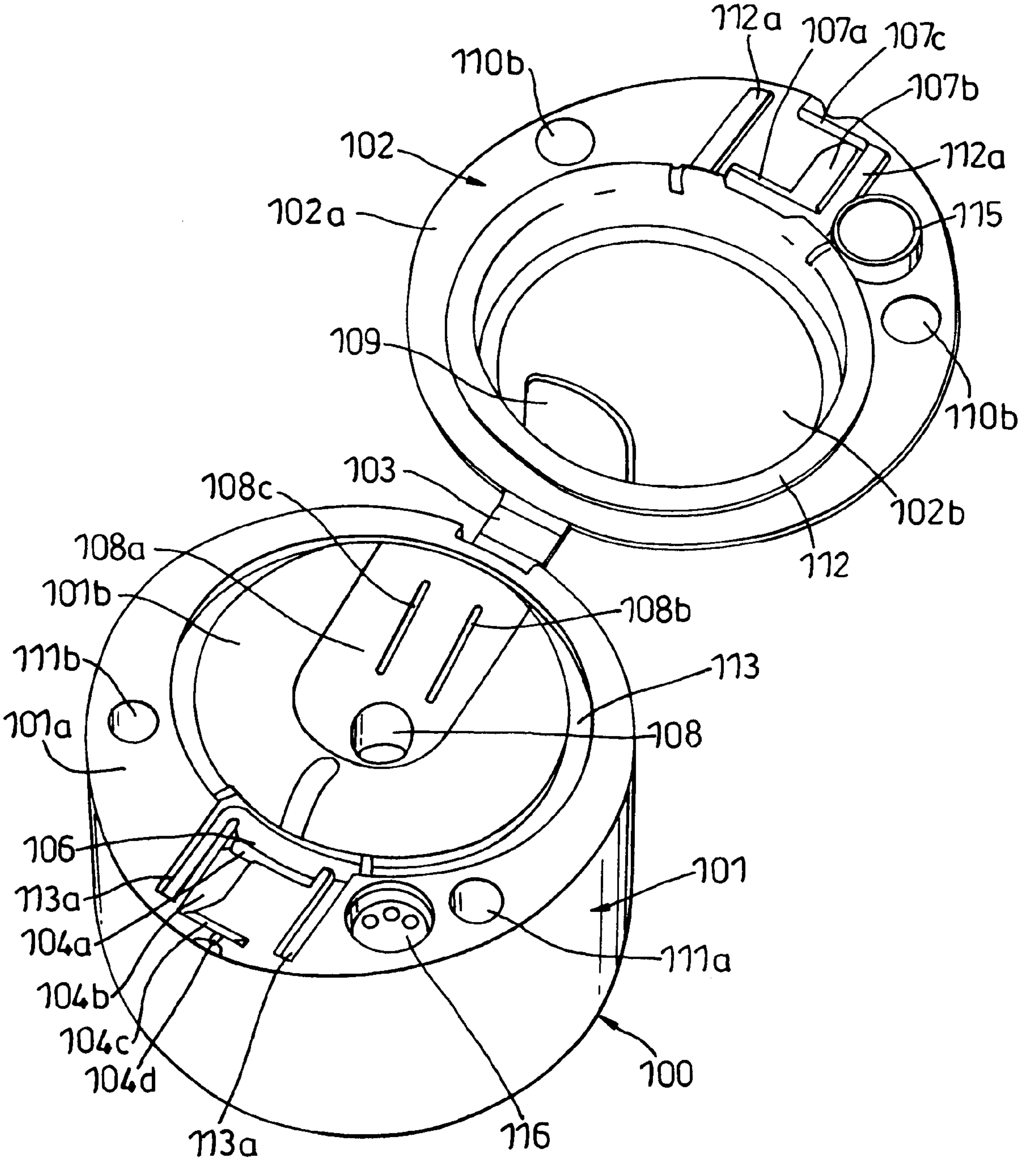
FIG. 1A is a perspective view of an example of a nozzle device adapted to dispense fluid in the form of a spray and which comprises a body formed of two component parts.
Figure 1B:
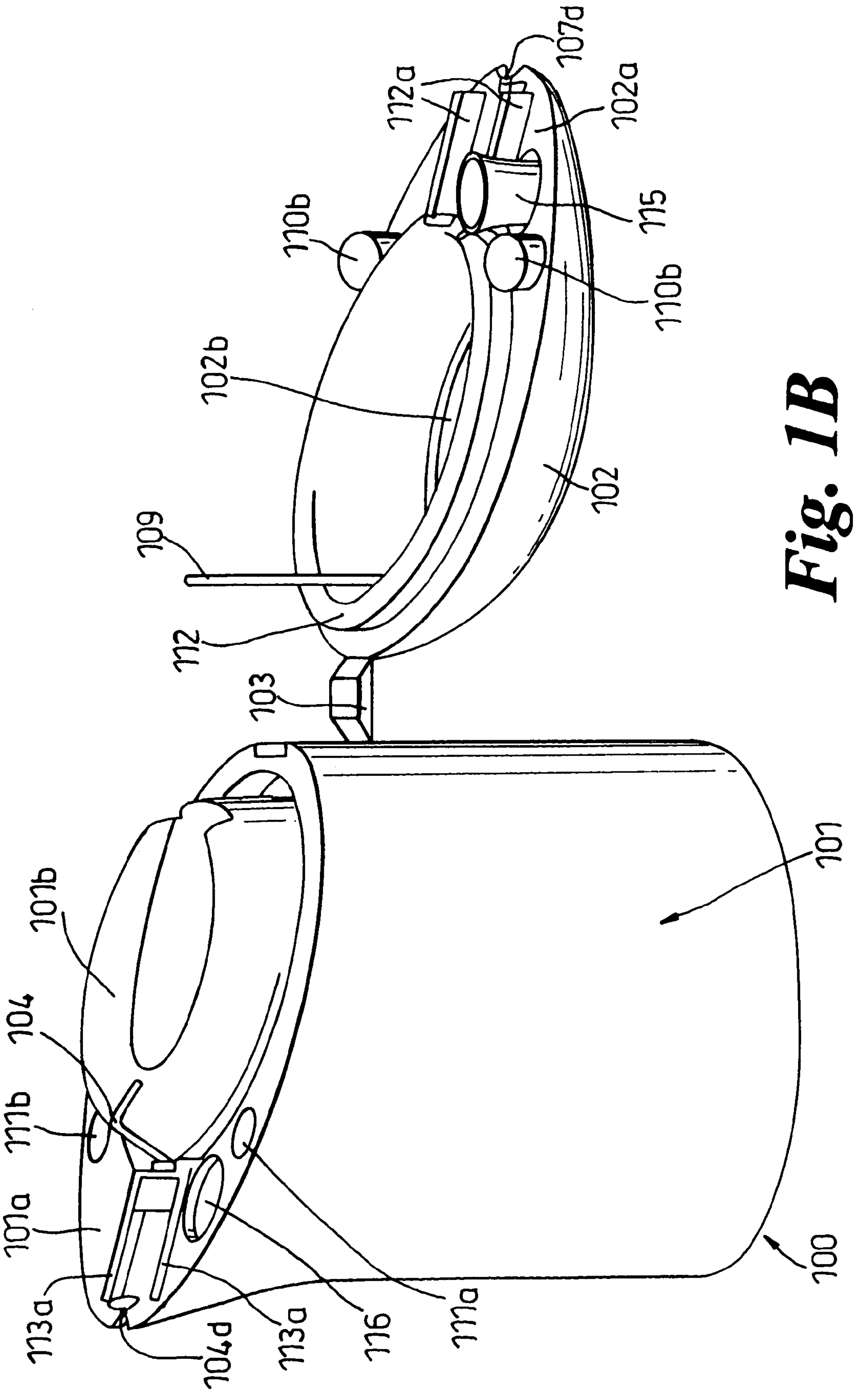
FIG. 1B is a further perspective of the device shown in FIG. 1A.

The nozzle device shown in FIGS. 1A and 1B comprises a body 100 formed of two parts, namely a base part 101 and an upper part 102, which are connected to one another by a foldable connection element 103.

The body 100 is formed from a single rigid plastic material in a single moulding operation. The device will be moulded in the configuration shown in FIGS. 1A and 1B and then the upper part 102 will be folded over about the connection element 103 and fitted to the upper surface of the base 101 to form the assembled nozzle arrangement. Once the base 101 and the upper part 102 are fitted together, the portion 102*a* of the under surface of the upper part 102 abuts the abutment portion/surface 101*a* of the upper surface of the base 101. The elevated portion 101*b* of the upper surface of the base 101 is received within recess 102*b* formed in the under surface of the upper part 102 to define an internal chamber.

A groove 104 formed in the elevated portion of the base 101*b* forms an initial portion of an outlet passageway in the assembled nozzle arrangement that leads from the internal chamber to an outlet valve. The outlet valve is formed by a resiliently deformable flap 105 formed on the under surface of the upper part 102 which is received within a recess 106 formed in the opposing abutment surface 101*a* of the base. The flap 105 extends over the end of the groove 104 when the base and upper parts are connected together to close the outlet passageway. The flap 105 is configured to resiliently deform away from the end of the groove 104 when the pressure within the internal chamber exceeds a predetermined minimum threshold to define an open passageway, as described further below. The flap 105 is also formed as a continuation of the ridge protrusion 112 discussed further below.

The remainder of the fluid flow passageway is defined by the alignment of grooves and or recesses 104*a*, 104*b* and 104*c* formed in the abutment surface 101*a* of the base 101 with corresponding grooves and/or recesses 107*a*, 107*b* and 107*c*, respectively. The portions 104*c* and 107*c* are semicircular recesses which align to form a circular swirl chamber which induces rotational flow into liquid passing through the outlet passageway during use. Liquid is ejected from this chamber during use through an outlet formed by the alignment of grooves 104*d* and 107*d* respectively.

The base 101 also defines an inlet orifice 108, which is positioned within a recess 108*a* formed in the elevated portion 101*b*. A resiliently deformable flap 109 formed on the under surface of the upper part 102 is received within the recess 108*a* in the assembled nozzle arrangement and is resiliently biased against the inlet opening to close off the inlet. The flap 109 is configured to resiliently deform away from the inlet opening to permit fluid to be drawn into the chamber when the pressure therein falls below the pressure in the attached container by at least a predetermined minimum threshold amount. The opening of the inlet 108 is provided with a lip against which the flap 109 abuts to form a seal. Supporting ribs 108*b* and 108*c* prevent the flap 109 exerting too much force on the lip.

Locating posts 110*a* and 110*b* formed on the under surface of the upper part 102 are received within holes 111*a* and 111*b* formed in the base and assist in holding the base and the upper part in tight abutment with one another. In addition, a ridge protrusion 112, which extends around the recess 102*b* is received within, and forms a sealing engagement with, a correspondingly shaped groove 113, which is formed in the upper surface of the base 101 and extends around the elevated portion 101*b*. The ridge 112 and groove fit tightly together to assist in holding the base 101 and the upper part 102 in tight abutment with one another. The ridge and groove also form a seal that prevents any fluid leaking out of the chamber and seeping between the upper part and the base. This seal also extends to encompass the outlet passageway and the outlet orifice by virtue of portions 112*a* and 113*a*.

The body also comprises an air leak valve which consists of a resiliently deformable member 115 formed on the under surface of the upper part 102, which is received within an opening 116 formed on the abutment surface 101*a* of the base when the nozzle arrangement is assembled. The opening 116, together with the groove 115 defines a passageway through which air may flow into the container from the outside in the assembled nozzle arrangement. The tip of the resiliently deformable member 115 is provided with a flared rim, the edges of which abut the internal walls of the opening 116 to form an airtight seal. If a reduced pressure exists in the container as a consequence of expelling fluid through the nozzle arrangement, the pressure differential between the interior of the container and the external environment causes the flared rim of the member 115 to deform inwards, thereby permitting air to flow into the container from the external environment. Once the pressure differential has been equalised, the flared rim returns to its original configuration resiliently biased configuration to prevent any further flow through the opening 116. It shall also be appreciated that if the container is inverted, the product cannot leak past the rim of the resiliently deformable member 115 and any pressure that is applied, by squeezing the container for example, simply pushes the flared rim into tighter abutment with the walls of the opening 116.

In an alternative embodiment, the air leak valve may be a post or flap positioned within a hole which can resiliently deform to open the passageway when a pressure differential exists, thereby allowing air to flow into the container from the external environment.

As a further alternative, the resiliently deformable upper part 102 could comprise a fine slit above an opening similar to opening 1102. This slit could be configured to open when a pressure differential exists.

As yet another alternative, the air release may be positioned closer to the resiliently deformable upper part 102 and configured such that, when the upper part is pressed downwards to expel the contents present in the chamber 201, the resiliently deformable member deforms in such a way that the air valve is opened, and air may flow into or out of the chamber to equalise any pressure differential that may exist.

During use, an operator will press the outer surface of the portion 102*b* of the upper part inwards, which is the resiliently deformable portion of the body defining the chamber. This portion of the upper part can be easily pressed into abutment with the upper surface of the portion 101*b* of the base and thereby compresses the internal chamber defined there between and causes the pressure therein to increase. When the pressure exceeds a predetermined minimum threshold value, the flap 105 will be displaced from its resiliently biased position to define an opening through which liquid can flow through the remainder of the outlet passageway to the outlet orifice where it is ejected in the form of a spray. As soon as the pressure within the chamber falls back below the predetermined minimum threshold value, the flap 105 will return to its resiliently biased configuration to close of the outlet passageway. When the applied pressure is removed from portion 102*b* of the upper part 102 it will return to its resiliently biased position and the volume of the chamber will increase. This causes the pressure within the chamber to decrease and the flap 109 of the inlet valve to be displaced to permit more liquid to be drawn into the chamber through the inlet valve.

Figure 2:
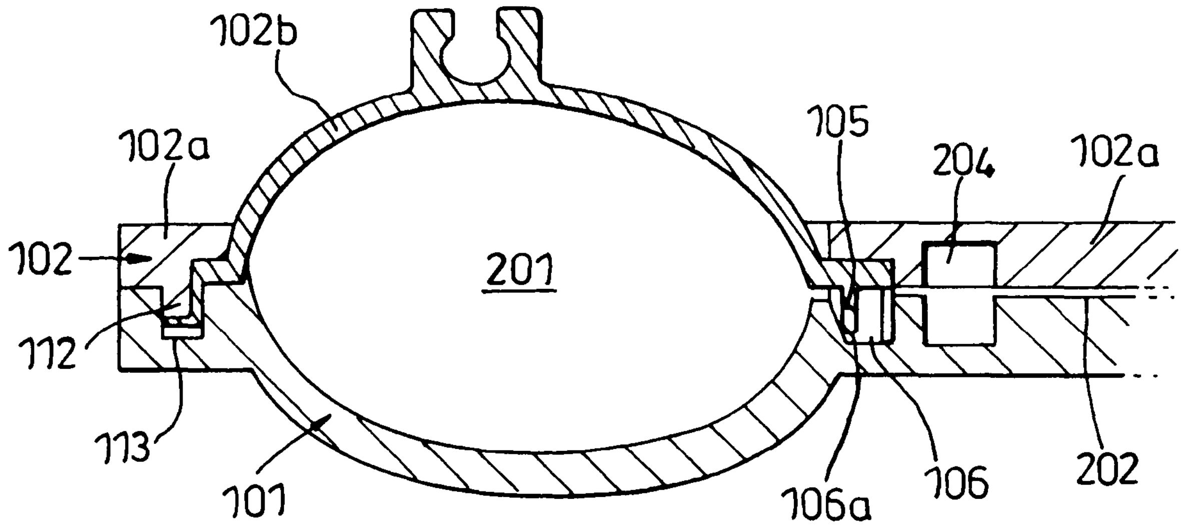
FIG. 2 is a cross-sectional diagrammatic view of an example of a further nozzle device adapted to dispense fluid in the of a spray and which comprises a body formed of two component parts.

A further example of a nozzle device adapted to dispense fluid in the form of a spray is shown in FIG. 2. In this example, only the internal chamber 201 and outlet passageway 202 are shown for the purpose of illustration. An inlet, although not shown, would usually be present in practice.

The example shown in FIG. 2 comprises a base made from a rigid plastic and an upper part 102 which comprises an abutment surface portion 102*a* formed from a rigid plastic, and a resiliently deformable portion 102*b*, which defines the chamber 201 together with portion 101*b* of the base 101 is made from a resiliently deformable material. This embodiment of the nozzle device may be formed by a bi-injection moulding process whereby the base and the portion 102*a* of the upper part 102 are moulded from a rigid plastic and the portion 102*b*, which is formed from a resiliently deformable plastic is then moulded onto the portion 102*a*. The base 101 and upper part 102 are then fitted together to form the assembled nozzle device. Optionally, the portion 102*a* and the base may be moulded from the same material and connected to one another by a foldable connection element.

In the embodiment shown in FIG. 2, the outlet valve again comprises flap 105 received within a recess 106 formed on the opposing abutment surface of the upper part. The side 106*a* of the recess is angled so that the flap 105 is resiliently biased to abut the edge to form a tight seal at its lower end.

The flap is deflected from the side 106*a* to define an opening through which fluid can flow when the required pressure is achieved in the chamber 201. Fluid then flows along the outlet passageway to the outlet orifice (not shown) and on its way passes through an expansion chamber 204 formed by aligned recesses formed on the opposing abutment surfaces 102*a* and 101*a*.

Figure 3:
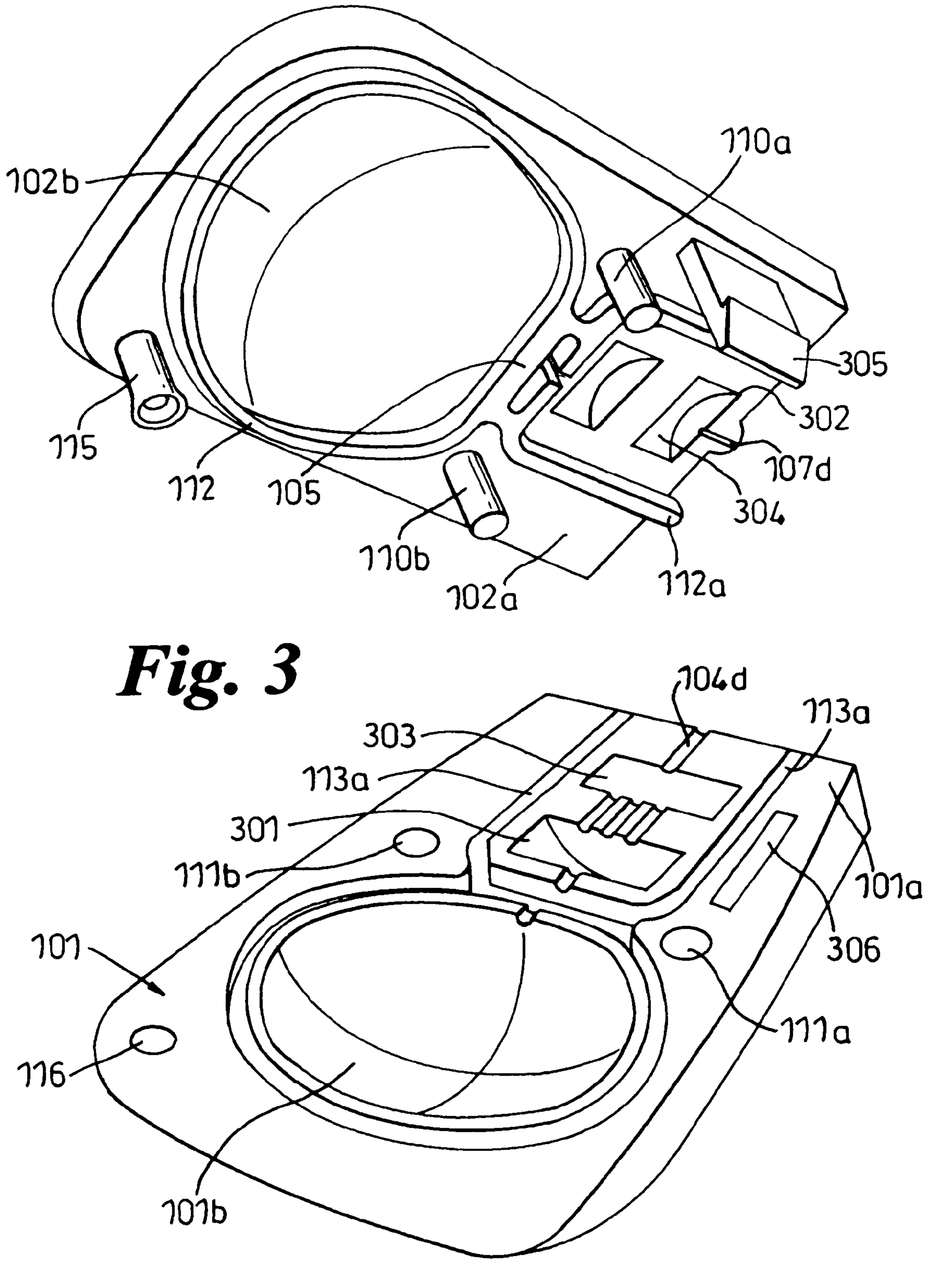
FIG. 3 is a perspective view of the upper part 102 shown in FIG. 1.

FIG. 3 shows the upper part 102 and base 101 of the embodiment shown in FIG. 2. Again, although not shown, the upper part also comprises a flap projection 109 which covers an inlet 108 formed in the base 101 to form the inlet valve, as discussed above. In this embodiment, the upper part 102 comprises a frame of rigid plastic material, which forms portion 102*a* of the upper part and which surrounds a region of resiliently deformable material, which forms portion 102*b* of the upper part 102, as previously described. The rigid plastic portion 102*a* abuts the portion 101*a* of the base (as shown in FIG. 2) to define the outlet passageway. As can bee seen from FIG. 3, outlet passageway 202 comprises a first expansion chamber 204 formed by the alignment of recesses 301 and 302, and a second outlet chamber formed by the alignment of recesses 303 and 304.

To ensure a tight abutment between the upper part 102 and the base 101, various clip features 305 are provided on the abutment surface of the upper part. The clip 305 formed on the abutment surface of the upper part 102 engages with recesses/cavities formed in the abutment surface 101*a* of the base to locate and secure the upper part and the base together.

Figure 4:
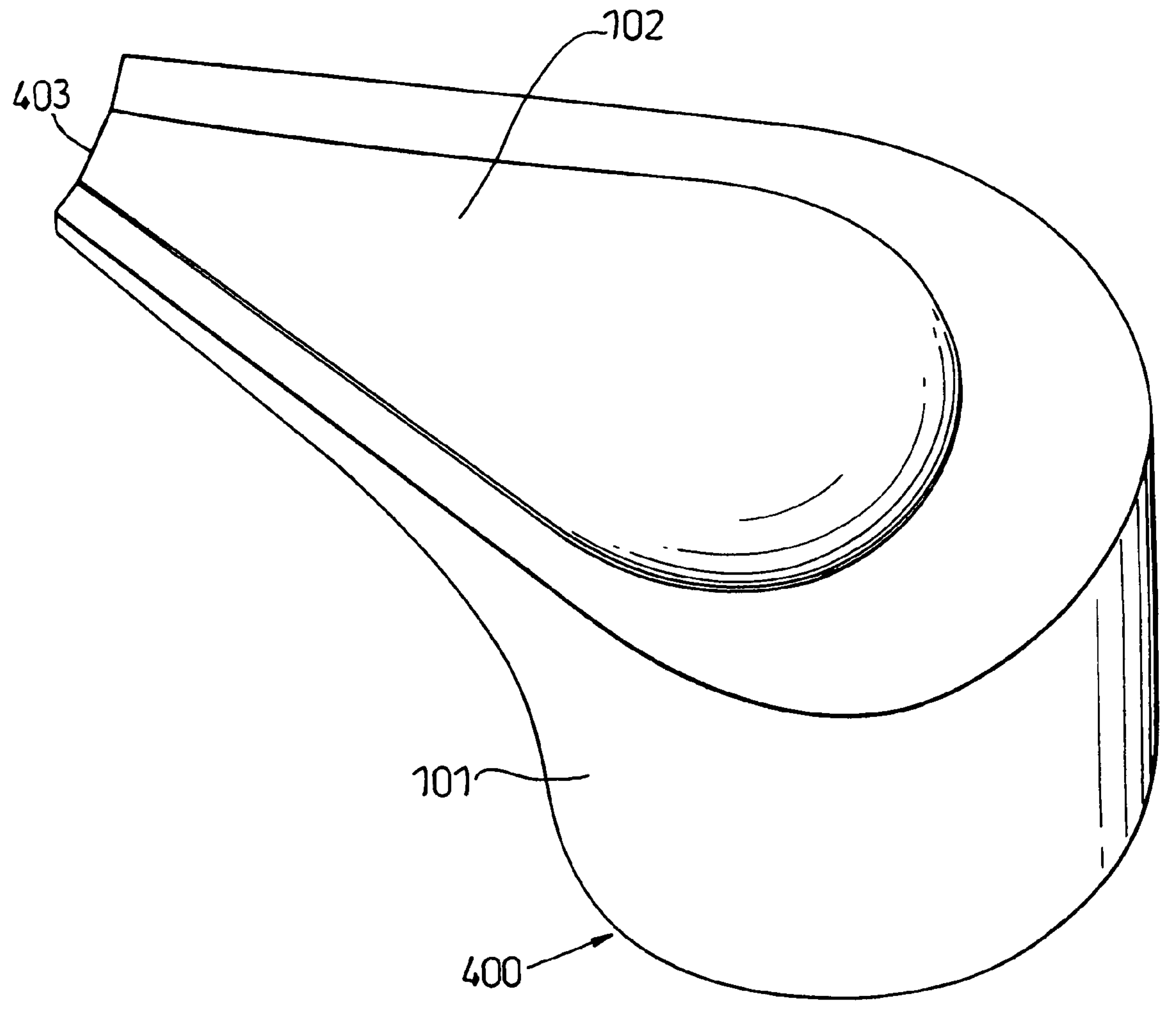
FIG. 4 is a perspective view of an example of a nozzle device adapted to dispense a bolus of fluid (i.e. the fluid is not broken up into droplets)

The embodiment shown in FIG. 4 is an example of a device adapted to dispense fluids as a bolus of liquid rather than as a spray. The comprises a body 400 formed of two parts, namely a base part 101 and an upper part 102, which is fitted to the upper surface of the base part 101. The body 400 is formed from a rigid plastic material, but the upper part 102 could be formed from a resiliently deformable material.

The base part 101 comprises a screw-threaded recess in its underside to enable the body to be secured to a screw-threaded neck of a container, effectively forming a screw-threaded cap. The upper part 102 is fitted to the upper surface base part 101 as shown in FIG. 4, and forms a substantially dome-shaped protrusion on the upper surface of the body 400. This dome shaped protrusion is the resiliently deformable portion of the body, which can be pressed by an operator to course it to deform inwards to reduce the volume of the internal chamber. This causes fluid to be ejected from the chamber through the outlet orifice 403.

Figure 5:
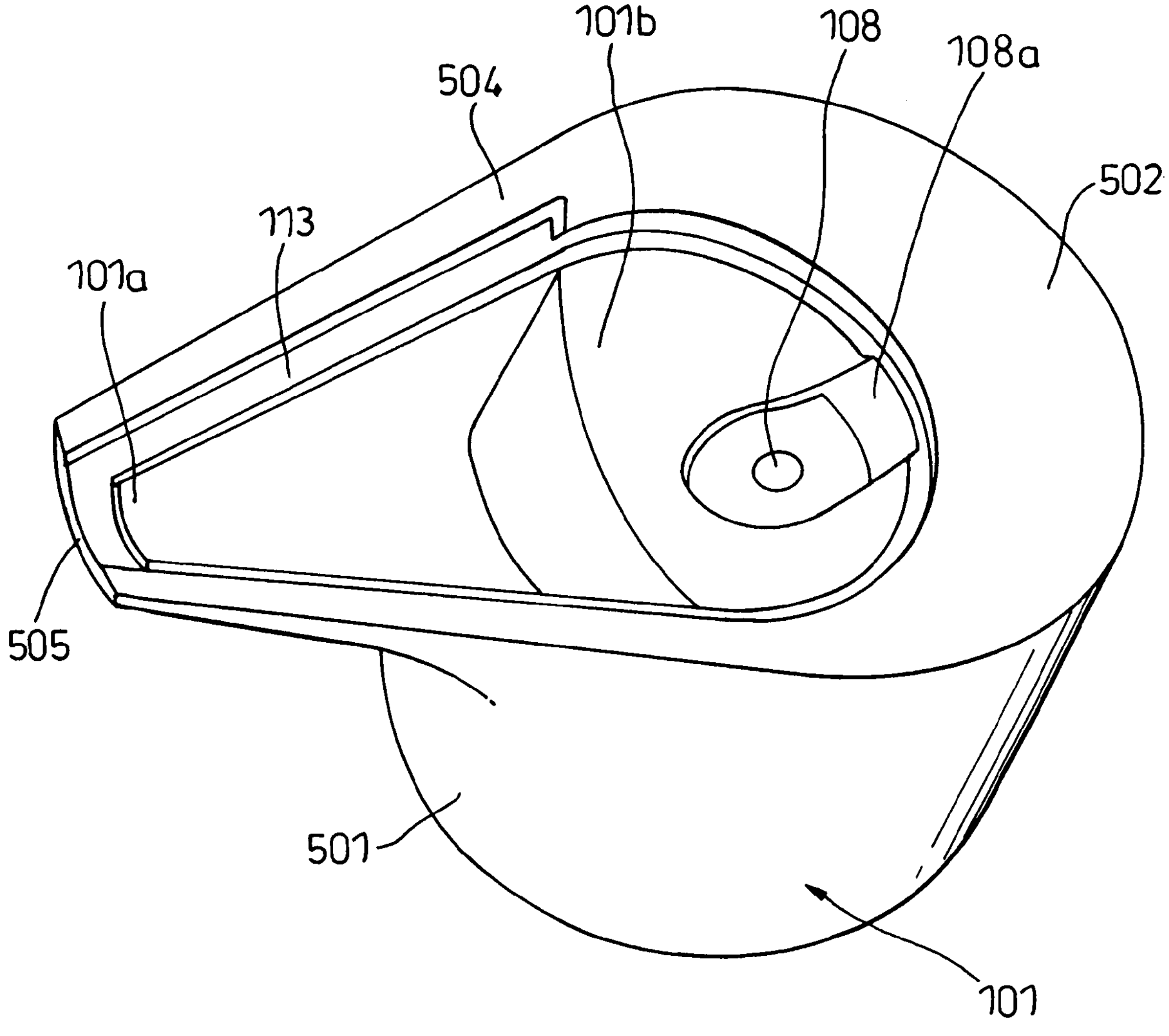
FIG. 5 is a perspective view of the base part 101 shown in FIG. 4, without the upper part 102 present.

A perspective view of the base part 101 is shown in FIG. 5. Referring to FIG. 5, the base part 101 comprises a downwardly extending portion 501, the under surface of which is provided with the screw threaded recess previously mentioned. The upper surface of the base 101 has a perimeter edge 504, which encircles a central recessed portion 502. The recessed portion 502 consists of a deeper portion 101*b* shaped substantially like an inverted dome, which extends to form the lower part of a generally spout-like outlet having an edge 505 that defines a portion of the outlet orifice. In the region of the outlet edge 505 of the base 101, the recessed portion 502 forms an abutment surface 101*a*, which, together with the upper part 102, defines an outlet passage/valve of the nozzle device leading to the outlet orifice formed by edge 505 and a corresponding edge of the upper portion.

Positioned within recess 502, and just inside the edge 504, is a channel 113, the significance of which will be come apparent in the discussion of FIG. 6 below. Also positioned in the region 101*b* of the recess 502 is an inlet opening 108, through which fluid may be drawn into the nozzle device from the associated container during use. The opening of the inlet 108 is positioned within a further recess 108*a*, the significance of which will again become apparent in the discussion of FIG. 6 below.

Figure 6:
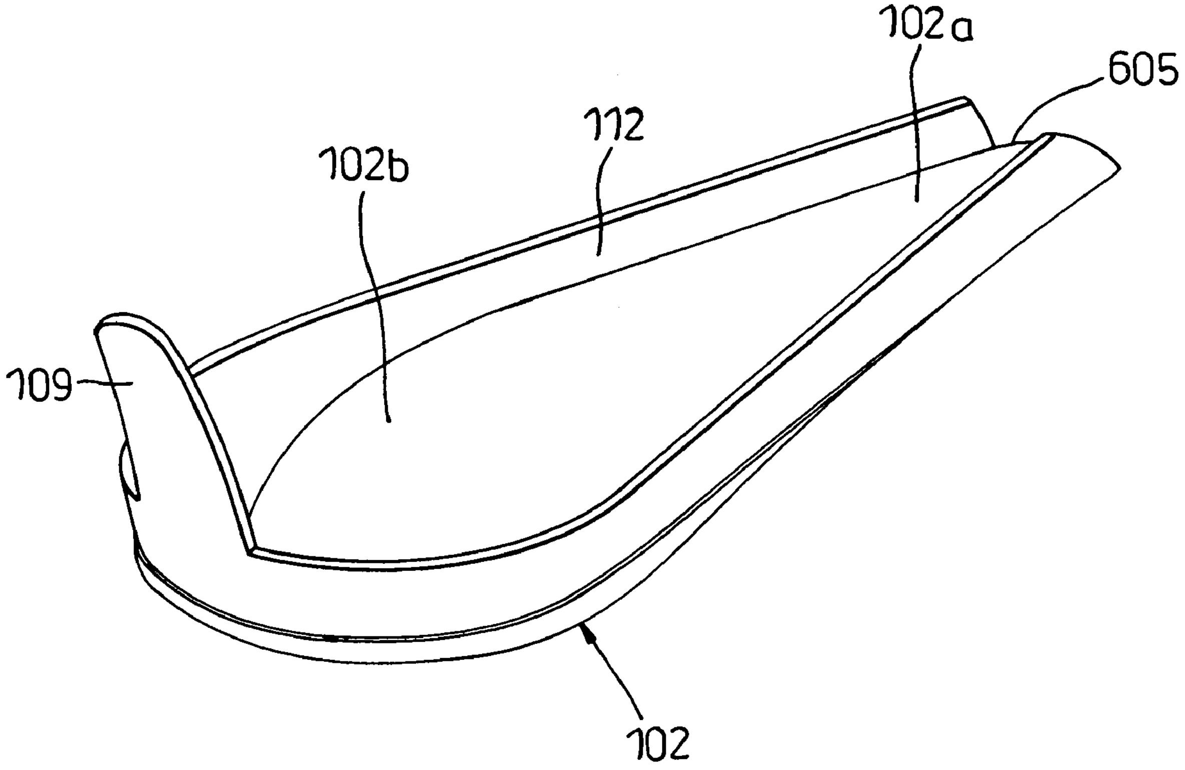
FIG. 6 is a perspective view of the upper part 102 shown in FIG. 4.

The under surface of the upper part 102 is shown in more detail in FIG. 6 (for the purpose of illustration, the upper part shown in FIG. 6 is inverted). The under surface of the upper part 102 is surrounded by a lip/ridge protrusion 112, which, when the upper part 102 is fitted to the base 101, is received within the channel 113 to form a tight seal between the base and the upper part, thereby preventing any fluid leakage occurring at the join between the base 101 and the upper part 102. The under surface of the upper part extends between the lip 112 and assumes the configuration a substantially dome-shaped recess at 102*b*, which aligns with the recessed portion 101*b* when the base and upper part are connected together, and extends to form an abutment surface at region 102*a*, which contacts the opposing abutment surface 110*a* of the base 101 in the assembled nozzle device to define the outlet passageway. The upper part additionally comprises a flap projection 109 which, when the upper surface is fitted to the base 101, sits within the recess 108*a* and is resiliently biased against the inlet opening 108. The flap projection 109 forms the resiliently deformable valve member of the inlet valve.

Figure 7B:
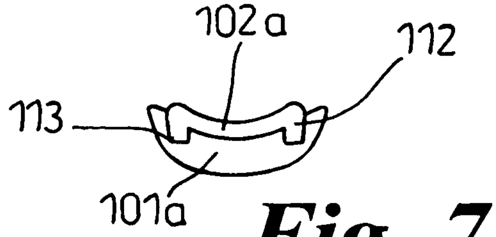
FIG. 7B is a further cross-sectional view taken along line A-A of FIG. 7A.
Figure 7A:
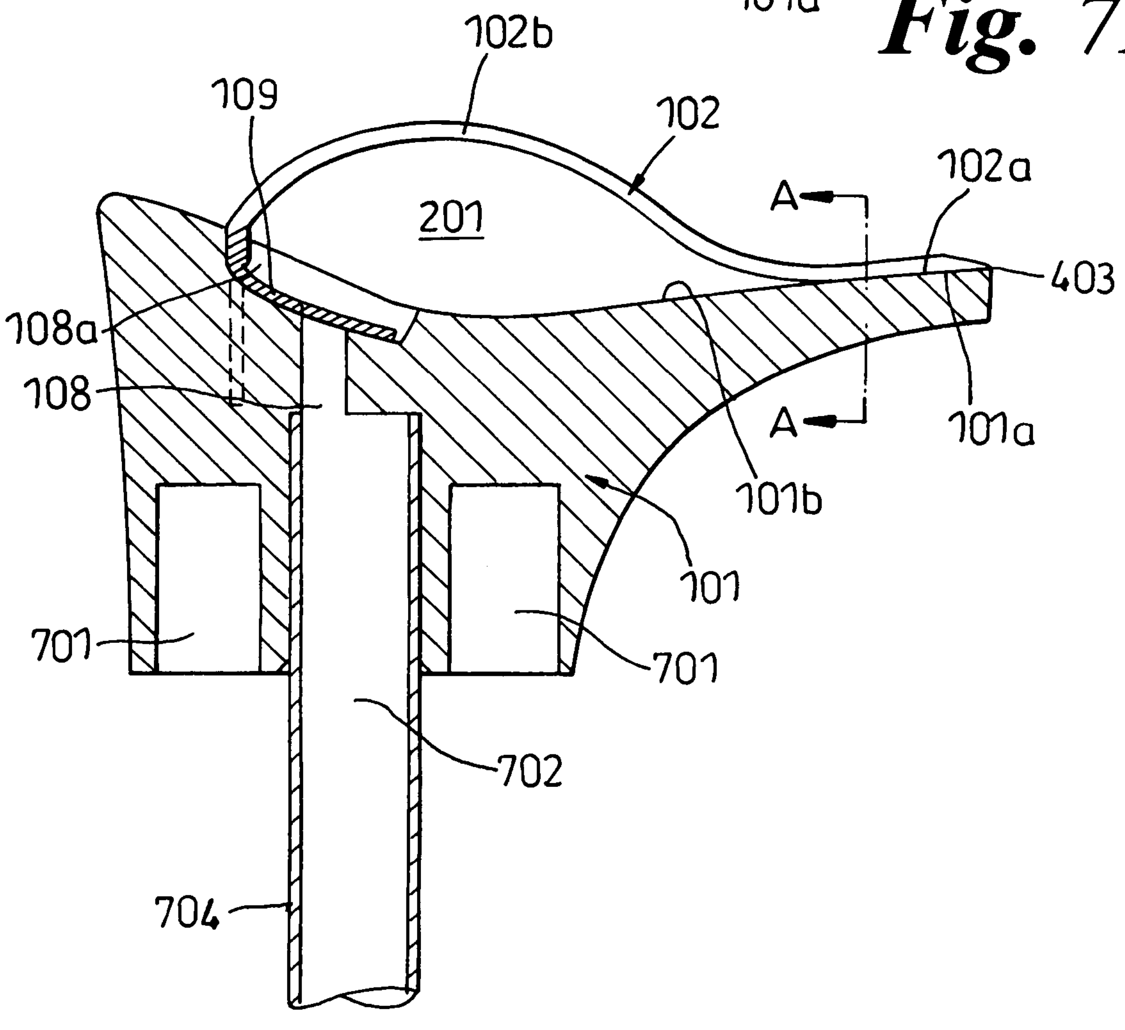
FIG. 7A is a cross-sectional view of the nozzle device shown in FIG. 4.

The internal structure and operation of the nozzle device 400 shown in FIG. 4 will be better understood by referring to the cross-sectional views shown in FIGS. 7A and 7B. Referring to FIG. 7A, the base 101 comprises recesses 701 and 702 on it's under surface. The recess 701 comprises a screw-thread (not shown) and is circular in profile so that it can be fitted to a circular screw-threaded neck opening of a container. The recess 702 on the other hand is adapted to receive a dip tube 704 and also extends to form the inlet opening 108 of the dispenser valve. The portion 101*b* of the upper surface 502 of the base 101, together with the portion 102*b* under surface of the upper part 102, defines an internal chamber 201. The portion 101*a* of the upper surface, together with the portion 102*a* of the under surface of the upper part 102 defines an outlet passage which leads to an outlet orifice 403 defined by the edge 505 of the base and edge 605 of the upper part. Thus, the portion 102*b* of the upper part 102 is made from a thin section of rigid plastic capable of undergoing a resilient deformation. This portion of the body 400 is therefore the resiliently deformable portion of the body that defines the chamber. The abutment surface formed by portion 102*a* of the upper part 102 is also configured to resiliently deform from the resiliently biased configuration whereby the outlet passageway is closed, as shown in FIGS. 7A and 7B, to a position in which the passageway is open. Thus, the resiliently deformable outlet passageway effectively forms the outlet valve of the device. Furthermore, the flap projection 109 of the upper part is received within the recess 108*a* surrounding the inlet 108 of the chamber to form an inlet flap valve, as previously discussed.

Therefore, during use, the resiliently deformable portion of the upper part 102, in the region 102*b* can be deformed downwards by the application of a pressure by, for example, an operator's finger pressing this region. The application of a pressure causes the volume of the chamber 201 to reduce and the pressure therein to increase. When the pressure within the chamber exceeds a predetermined minimum threshold value, the abutment surface 102*a* of the upper part will be caused to deform away from the opposing surface 101*a* of the base to define an open outlet passageway through which the fluid present in the chamber may pass through and be expelled through the outlet 403 of the nozzle device. It will be appreciated that fluid is prevented from flowing out of the chamber through the inlet by the flap 109. As fluid is ejected, the pressure within the chamber 201 will gradually fall as the fluid present within the chamber is dispensed and when it falls below the minimum threshold value the resiliently deformable abutment surface of the outlet passageway 102*a* will deform back to position whereby it abuts the surface 101*a* and the and the outlet passageway is closed.

If the pressure applied to the chamber in the region of 102*b* is then removed, the pressure within the chamber will decrease as the chamber deforms back to the expanded configuration by virtue of its inherent resilience. This reduction is pressure causes fluid to be drawn into the chamber through the inlet because the pressure differential between the inlet 108 and the chamber 201 causes the flap projection 109 to be deflected away from the inlet orifice. Once the portion 102*b* of the upper part of the body assumes its initial resiliently biased configuration, the flap projection 109 deforms back to the position shown in FIG. 7A whereby the inlet is closed.

As an alternative, the body of the embodiment shown in FIGS. 4 to 7 could be manufactured from a flexible plastic material. The dispenser could be made by any suitable moulding procedure. For example, the base 101 and upper part 102 could be moulded separately and then connected together either in the same mould or in separate moulds or, alternatively, one of the parts could be moulded first and the other part can be moulded onto the first part.

Figure 8A:
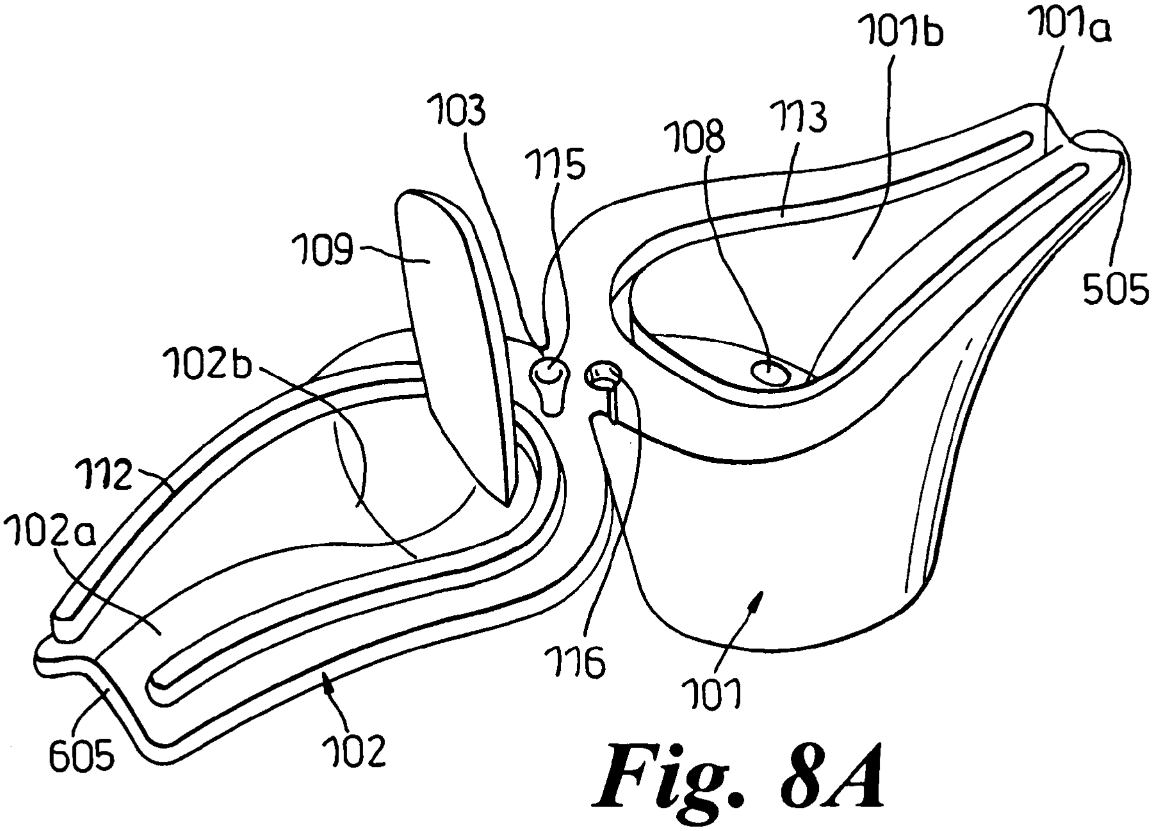
FIG. 8A is a perspective view of a further example of a nozzle device adapted to dispense a bolus of fluid.
Figure 8B:
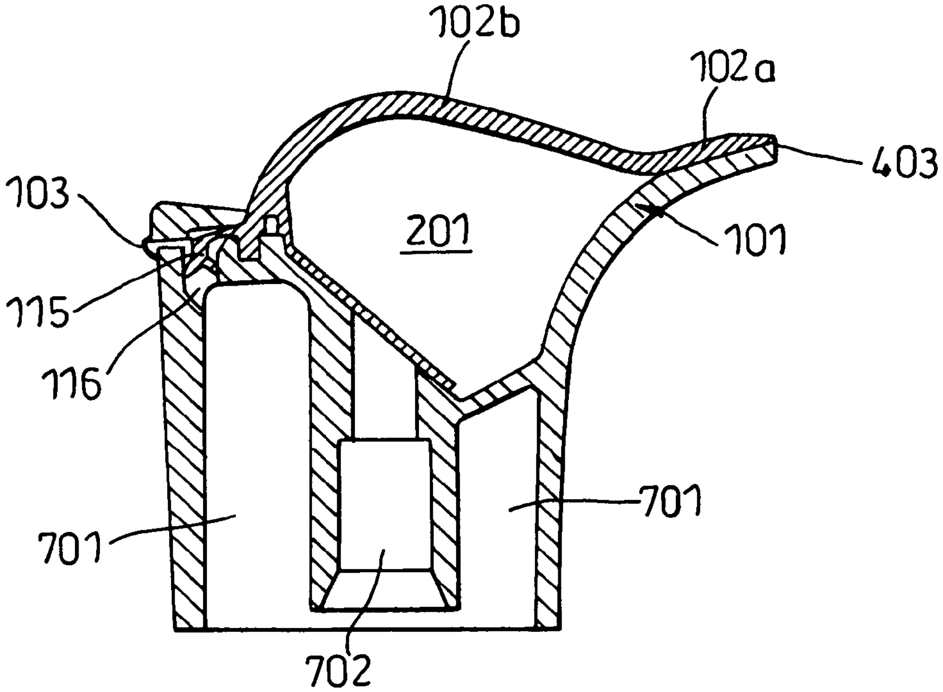
FIG. 8B is a cross-sectional view taken through the embodiment shown in FIG. 8A.

FIGS. 8A and 8B show a further example of a nozzle device adapted to dispense fluids as a bolus of liquid rather than as a spray. The embodiment shown in FIGS. 8A and 8B are virtually identical to the example shown in FIGS. 4 to 7 apart from the fact that this embodiment additionally comprises an air leak valve adapted to permit air to flow into the container from the outside to equalise any pressure differential between the container and the external environment that may exist (but prevent fluid flowing the other way if the container is inverted, for example) and the upper part and the base are integrally formed with one another and connected via a foldable connection element 801.

The air leak valve comprises a valve member 115 disposed with an opening 116, as previously described in reference to FIG. 1.

In this embodiment, the upper part is formed entirely from a rigid plastic material, but, in alternative embodiments, the upper part may comprise a framework of a rigid plastic (the same as that of the base) to which a flexible plastic material is over-moulded (i.e. the device is a bi-injection moulding).

The main advantage of the embodiment shown in FIGS. 8A and 8B is that the base 101 and the upper part 102 are integrally formed, which means that the entire body of the dispenser can be moulded in a single step from a single material, with all the consequential advantages of reduced costs due to minimal assembly and processing times. For instance, the dispenser could be moulded in the open configuration shown in FIG. 8A, and the upper part could then be folded over about the connection element 801 to form the assembled nozzle device.

Figure 9:
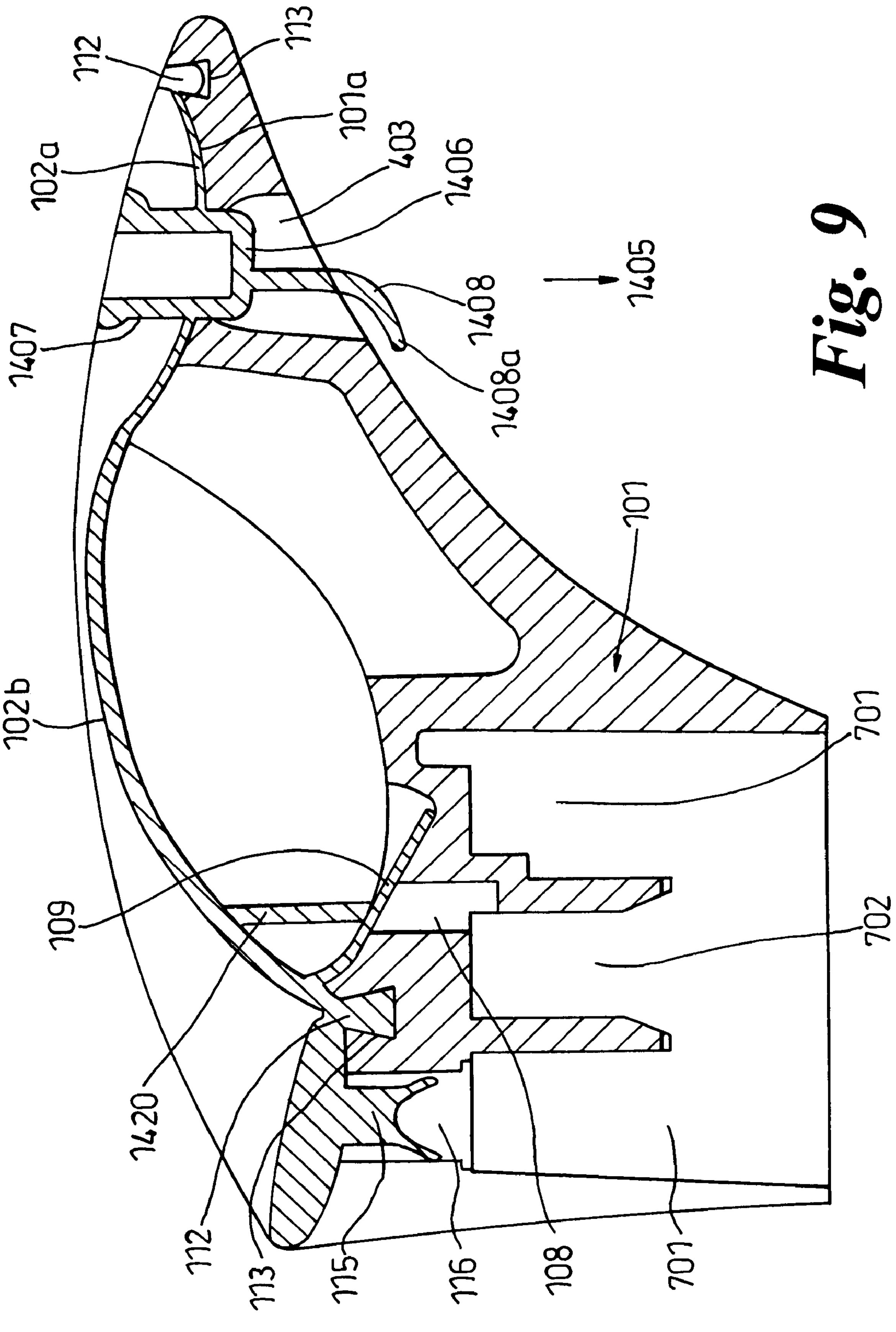
FIG. 9 is a cross-sectional view taken through another an example of a nozzle device adapted to dispense a bolus of fluid.

A further example of a nozzle device adapted to dispense fluids as a bolus of liquid rather than as a spray is shown in FIG. 9. The dispensing device shown in FIG. 9 comprises many features of the embodiments previously described, as shown by the like referenced numerals. However, there are also a number of modifications.

Specifically, the outlet 403 of the device 1401 has been modified so that the product is dispensed downwards in the direction of arrow 1405. Of course it shall be appreciated that the outlet may be configured to dispense the product at any angle (e.g. at 30-45° to the vertical).

The outlet passageway has also been further adapted to incorporate a locking means. The locking means comprises a plug 1406 formed on the upper part 102. The plug extends to form a button 1407 on the upper surface of the upper part 102, which can be pressed to urge the plug 1406 into a sealing engagement with the outlet orifice 403, as shown in FIG. 9. In this configuration, the plug 1406 seals the outlet 403 and prevents fluid being dispensed from the chamber. To release the seal and permit fluid to be dispensed through the outlet 403, an operator must pull the button 1407 upwards to remove the plug 1406 from the outlet. Once released, the portion 102*a* of the upper part can resiliently deform away from the abutment surface of the base 101*a* to define an open outlet passageway when the chamber is compressed. This deformation of portion 102*a* of the upper part when fluid is flowing towards the outlet 403 also removes the plug from the vicinity of the outlet 403 to define a passageway that fluid can flow through. As soon as the contents of the chamber have been dispensed, the portion 102*a* and the plug 1406 of the upper part will deform back to close the outlet passageway. In this regard, the plug 1406 sits over the outlet 403 to effectively form a non-return valve, which prevents any air or product being drawn back into the chamber. After use, an operator can press the button 1407 to plug the outlet and prevent any accidental actuation of the device.

A generally L-shaped member 1408 having a lip 1408*a* hangs down from the base of the plug 1406 and protrudes through the outlet 403. When the plug is in a sealing engagement with the outlet 403, as shown in FIG. 9, the lip 1408*a* is displaced from the underside of the base. However, when the button 1407 is pulled to remove the plug 1407, the lip 1408*a* of the member 1408 abuts the underside of the base and prevents the button 1407 being pulled too far. Any other means of preventing the button 1407 from being pulled too far can be used.

The seal formed by the ridge 112 being received within a corresponding groove 113 has also been modified in two respects. Firstly, the seal extends around the entire perimeter of the chamber 201 and additionally, encompasses the outlet passageway defined between the abutment surfaces of portion 101*a* of the base and 102*a* of the upper part. Therefore, a complete seal is formed to prevent fluid seeping between the upper part 102 and the base part 101 and leaking out of the nozzle. Secondly, the thickness of the ridge protrusion tapes towards its base and the width of the groove 113 tapers correspondingly towards its opening. Hence, the ridge 112 can be pushed, or snap fitted, into the groove 113 to form a tight sealing engagement, which also functions to hold the upper part 102 the base 101 together.

The flap valve member 109 at the inlet has also been provided with a support arm 1420. The support arm 1420 is configured to resiliently bias the flap 109 over the inlet orifice and thereby increases the strength of the seal formed there between, as well as the pressure required to cause the flap 109 to deform away and open the inlet 108 during use.

The pump dispensers shown in FIGS. 1 to 9 comprise a generally dome-shaped protrusion on the upper surface, which must be pressed by an operator to compress the chamber and cause the contents stored therein to be expelled through the outlet. One potential problem with such designs is that the operator needs to press the dome using their finger, which requires the operator to position their finger in the correct location to ensure that the chamber is compressed and fluid is ejected through the outlet. It has also been found that a relatively high pressure is required to press the dome to a sufficient extent, which can be a further disadvantage, especially as it is commonplace for people to actuate conventional pump dispensers by applying pressure with a different portion of the their hand, such as using their palm, or even using their elbow or forearm. In these instances, it would be much more problematical to adequately compress the dome using, for example, the palm of the hand in order actuate the ejection of fluid from the device.

Figure 10A:
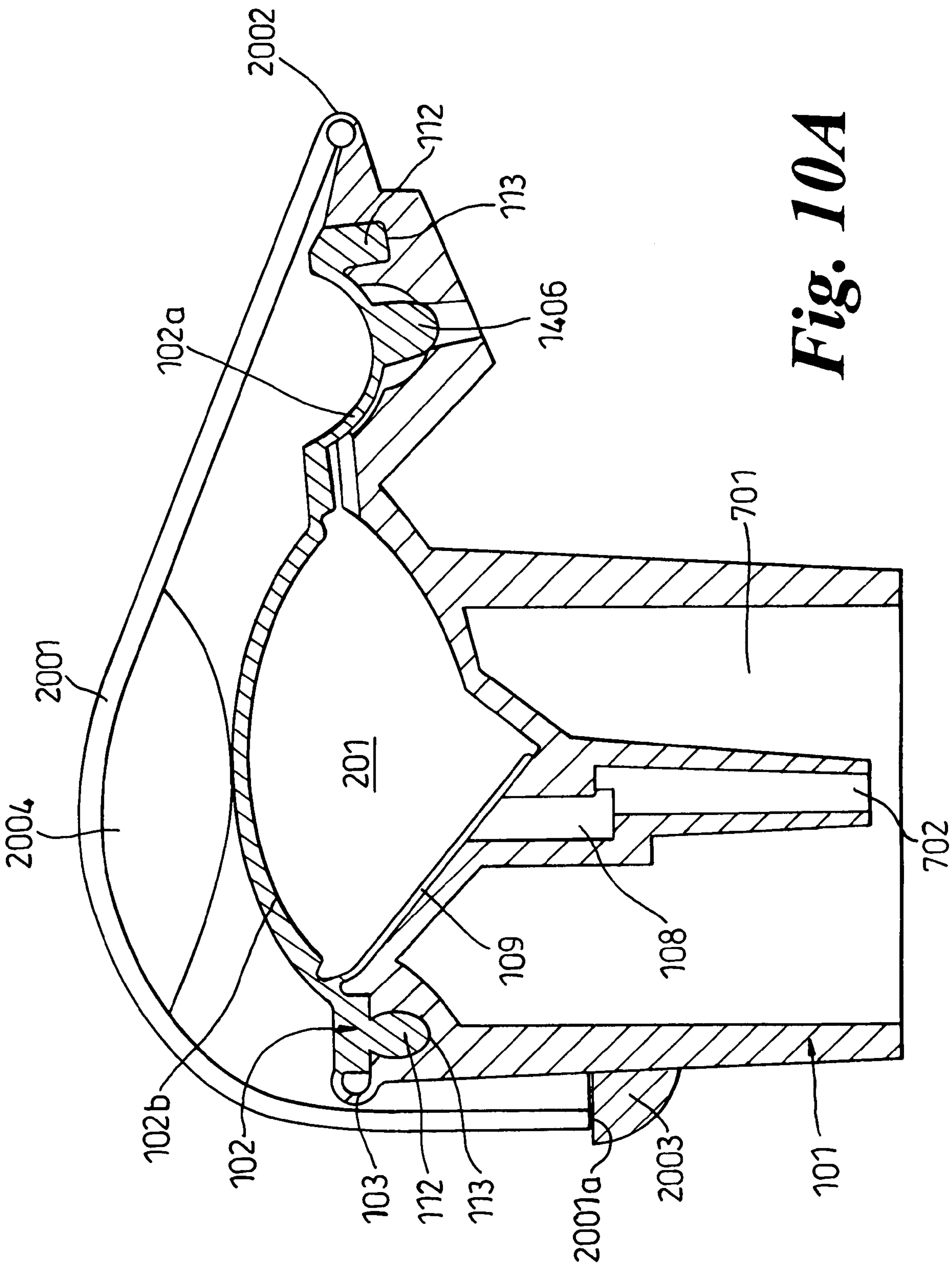
FIGS. 10*a*, 10*b*, 10*c* and 10*d* show various illustrations of an embodiment according of the invention.
Figures 10B, 10C, 10D:
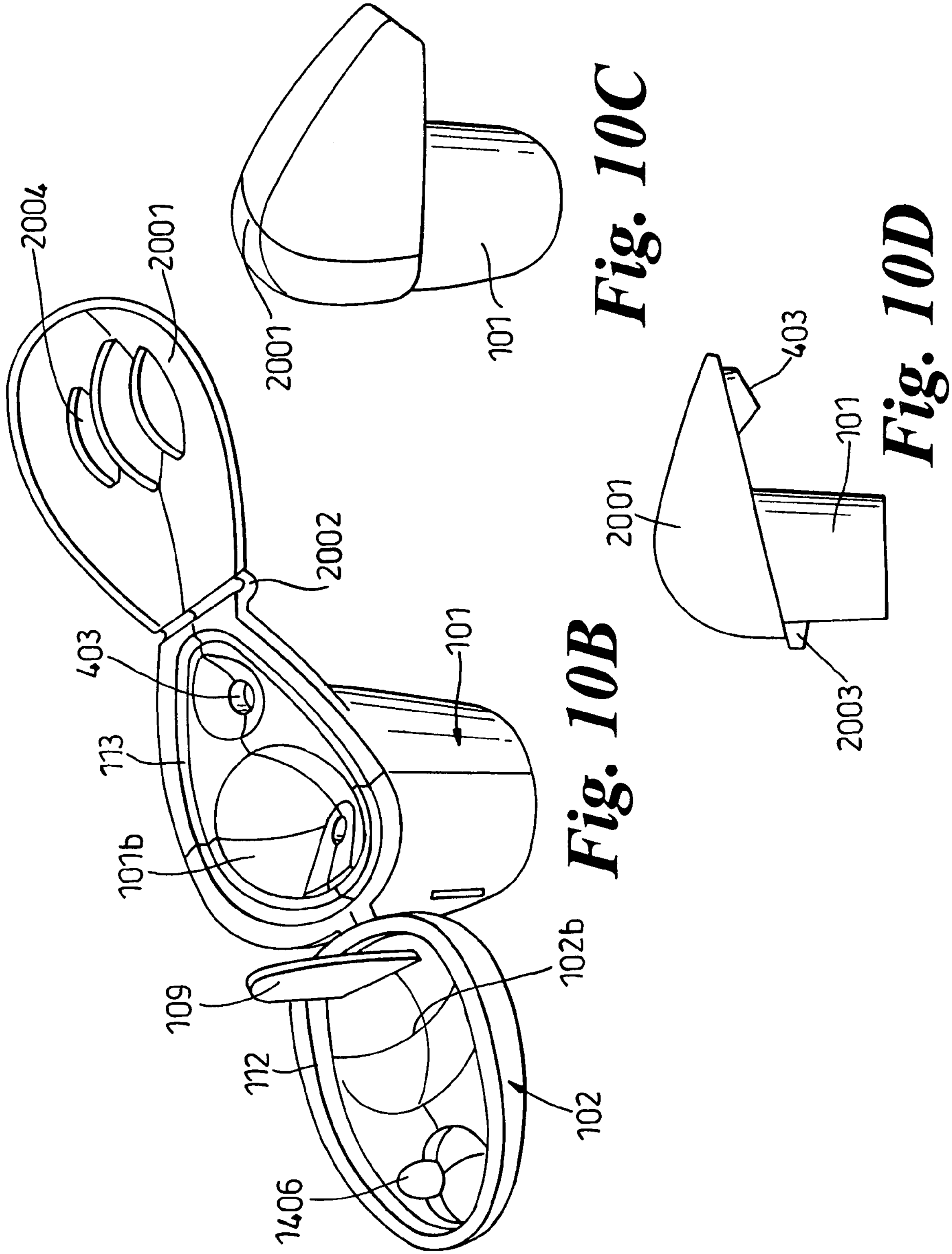

The embodiment of the present invention shown in FIGS. 10*a-d* provides a solution to these problems. FIGS. 10*a* and 10*b* show cross-sectional and perspective views, respectively, of a nozzle device according to the present invention. The nozzle device shown in these Figures is virtually the same as that shown in FIG. 9, except that the nozzle device additionally comprises an actuator member in the form of an over cap 2001, which is folded over from the front edge of the upper surface of the base, about a hinged connection 2002 to cover the base 101 and the upper part 102 of the body, as shown in FIG. 10*a*. The leading edge 2001*a* of the cap 2001 extends right over the upper surface of the upper part and is received on an abutment ledge 2003 formed on the rear side of the base. The ledge 2003 prevents the cover being pushed downwards to prevent the accidental actuation of the device. To release the lock, the sides of the over cap can be squeezed inwards, as shown by arrows 2005 in FIG. 10*c*, to displace the edge of the over cap 2001 from the ledge. The over cap 2001 may then be pressed so that the protrusions 2004 formed on the under surface of the upper part 102 deform the resiliently deformable portion 102*b* of the upper part 102 to compress the chamber 201. The increase in pressure causes the resiliently mounted plug 1406 to be displaced from the outlet orifice 403 so that fluid can be dispensed.

The provision of the over cap 2001 provides a surface which can be depressed by an operator to actuate the dispensing of the fluid present in the chamber. Although the sides of the over cap need to be squeezed to actuate the device shown in FIGS. 10*a-d*, the abutment ledge 2003 could be configured to swing into and out of place in alternative embodiments, or may not be present at all, so that the device can be conveniently operated by a pressing the over cap 2001 with any part of the body. Thus, the requirement to use a finger to actuate the device is obviated.

Figures 11A, 11B, 11C:
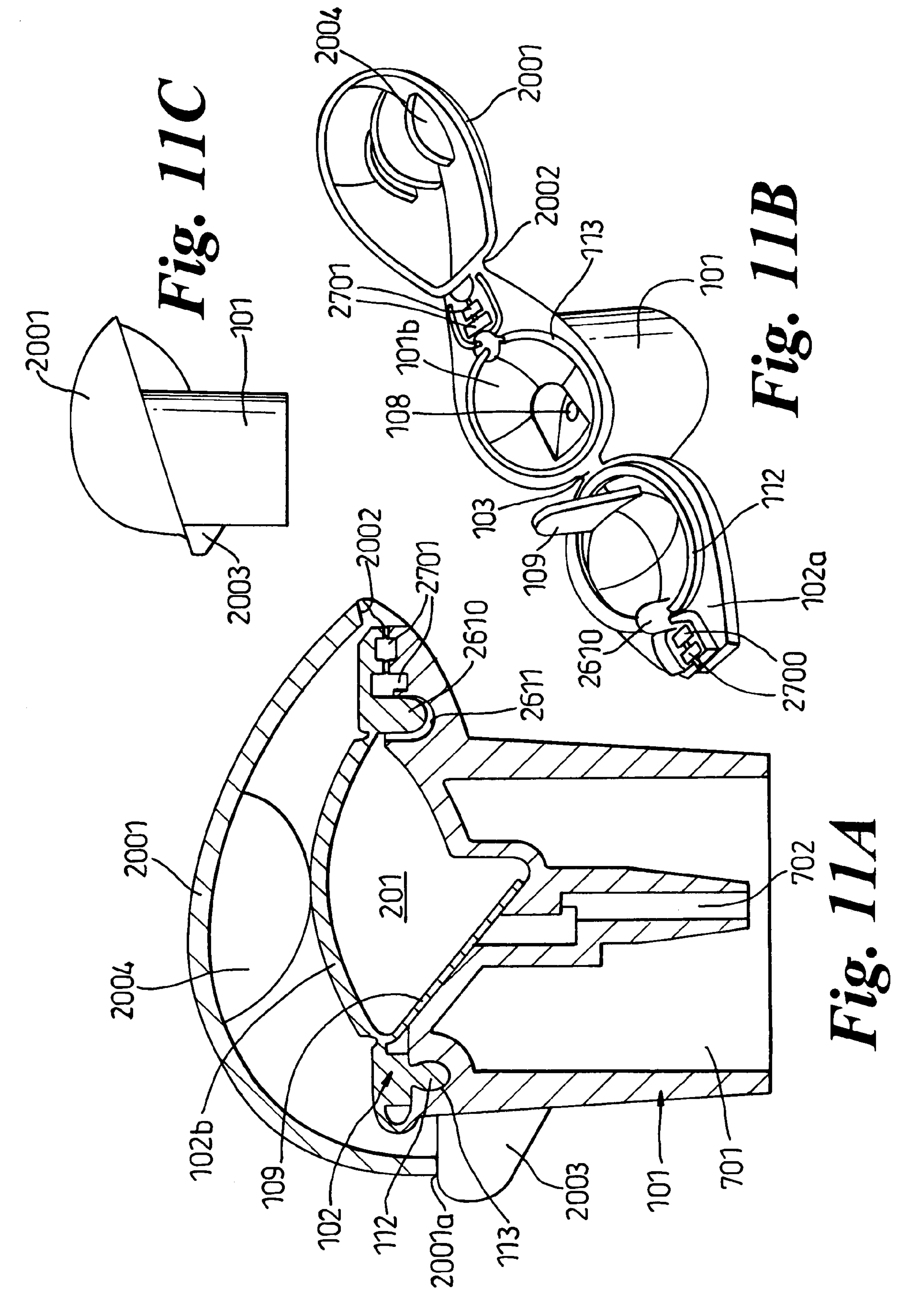
FIGS. 11*a*, 11*b* and 11*c* show various illustrations of another embodiment of the invention.

A further alternative embodiment of the invention is shown in FIGS. 11*a* to 11*c*. This embodiment is the same as that shown in FIGS. 10*a* to 10*d*, except that the outlet of the device is adapted to generate a spray, rather than dispense a bolus of liquid. Thus, the outlet comprises an outlet valve formed by valve member 2610 being resiliently biased against the recess 2611 formed in the abutment surface 101*a* of the base 101. The valve member 2610 is configured to be resiliently displaced form the recess 2611 when the pressure within the chamber exceeds a predetermined minimum threshold to define an opening through which fluid from the chamber can flow. Downstream from the outlet valve is an outlet passageway formed by the alignment of grooves and recesses 2700 formed on the abutment surface 102*a* of the upper part with corresponding grooves/recesses 2701 formed on the opposing abutment surface 101*a* of the base 101. This provides and outlet passageway with two chambers 2602 and 2603 positioned along it length. The chambers are expansion chambers which contribute to the break up of fluid droplets passing through the outlet passageway.

Figures 12A, 12B:
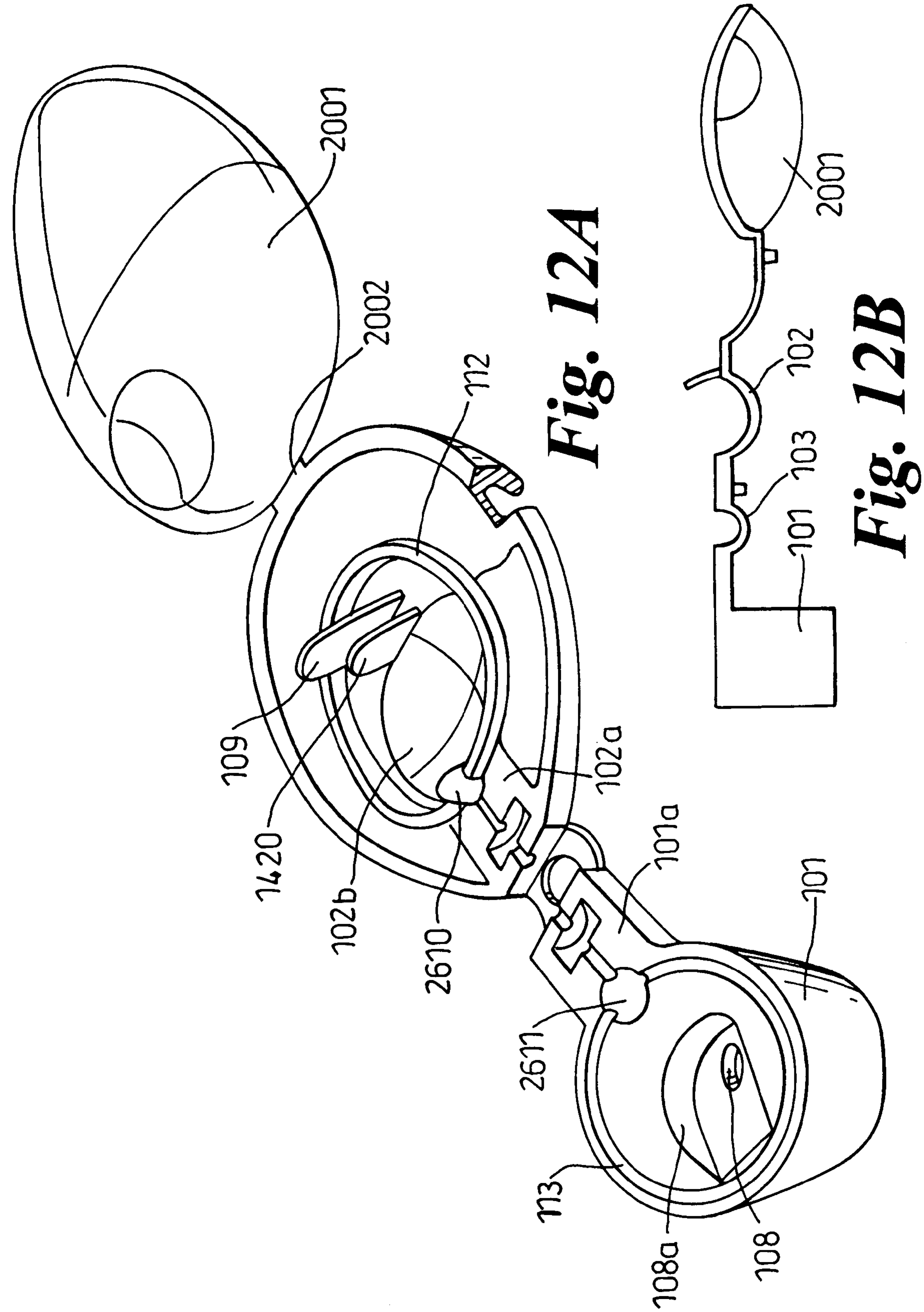
FIGS. 12*a*, 12*b*, 12*c* and 12*d* show various views of further embodiment of the present invention.
Figure 12C:
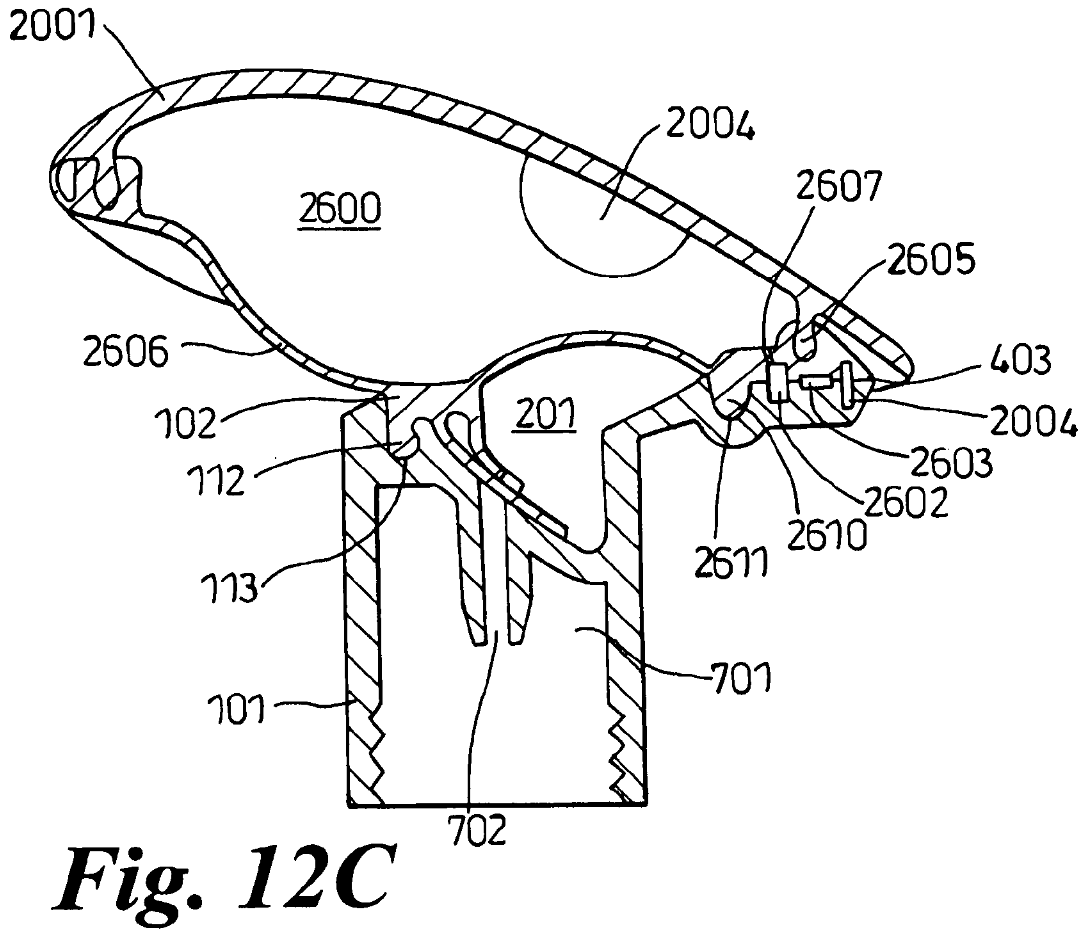
Figure 12D:
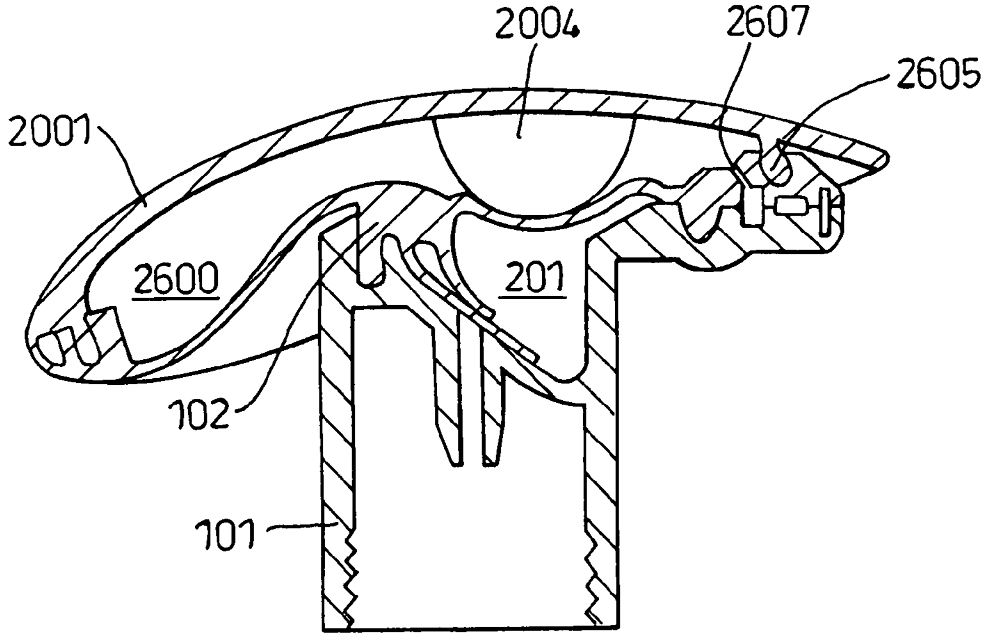

A preferred embodiment of the present invention is shown in FIGS. 12*a-d*. The embodiment shown in these Figures is a dispenser nozzle configured to dispense fluids in the form of a spray. Referring to FIGS. 12*a-d*, it can be seen this embodiment of the invention is composed of three parts, namely a base 101, an upper part 102 and an actuator member in the form of an over cap or pan handle 2001. All three parts can be integrally formed as a single component, as shown in FIGS. 12*a* and 12*b*, and subsequently assembled to form the functional device, as shown in FIGS. 12*c* and 12*d*.

In this regard, the upper part 102 fits onto the upper surface of the base 101 to define an internal chamber 201, as previously described. During use, fluid is drawn into the chamber 201 through the inlet 108 when the chamber expands, and is expelled through the outlet 403 when the chamber is compressed. To reach the outlet, the fluid in the chamber must firstly reach a pressure that is sufficient to displace the valve member 2610 to from the valve seat/recess 2611 so that fluid can flow along the outlet passageway defined between the upper part 102 and the base 101. Various spray modifying features shown by chambers 2602, 2603 and 2604 are formed in the passageway to atomise the fluid flowing through during use into small droplets.

The over cap or pan handle 2001 is fitted over the upper part 102 to define an air chamber 2600 there between. The over cap is pivotally mounted to the upper part 102 about the connection element 2605. The over cap 2001 is also rigid so that it provides a firm surface for an operator to press.

Pressing the over cap 2001 downwards in the direction of arrow 2505 causes the over cap to be urged towards the upper surface of the upper part 102, thereby causing the side wall 2606 of the chamber 2600 formed by the upper part 102 to resiliently deform, as shown in FIG. 12*d*. This movement compresses the air chamber 2600 thereby causing air to be expelled into the chamber 2602 through the outlet channel 2607. In addition, the protrusion 2608 engages portion 102*b* of the upper part and causes it to distend inwards, thereby comprising the chamber 201 to cause fluid therein to be ejected. The fluid ejected from chamber 201 mixes with the air stream ejected from the air chamber 2600 in the chamber 2602, which results in the further atomisation of the droplets of fluid ejected through the outlet 403. When the applied pressure is released, the over cap 2001 is urged away from the upper part 102 as the side wall 2606 deforms back to its initial resiliently biased configuration, as shown in FIG. 12*c*. This increases the volume of both of the chambers 201 and 2600, and thereby causes the pressure therein to reduce. This reduction in pressure results in more fluid being drawn into the chamber 201 through the inlet 108 and more air to be drawn into the air chamber 2600, either through the outlet 403 and passageway 2607, or through a separate one-way air inlet valve (not shown).

A pre-compression valve (not shown) is provided in the outlet channel to ensure an air stream is only ejected from the chamber 2600 when the pressure therein exceeds a predetermined minimum value. This valve can be configured to open at the same time as the valve formed by the valve member 2602 and valve seat 2603 so that fluid from the chamber 201 and an air stream from the chamber 2600 are both released into the outlet passageway at the same time.

Although not shown, the embodiment shown in FIGS. 12*a-d* would usually have a lock to prevent the accidental actuation of the device. Any suitable lock could be used.

Although the device shown in FIGS. 12*a-d* is adapted to generate a spray, it could equally be a dispenser adapted to eject a volume of liquid at a lower pressure, and not in the form of a spray. The air from the chamber 2600 would still mix with the fluid ejected from the chamber and the respective pre-compression valves for each chamber would preferably also be present.

The main difference between the embodiments of the invention and those previously described is that the actuator member provides a solid surface for the operator to press. This surface does not deform in the same manner as the deformable surfaces pressed in the embodiments shown in FIGS. 1 to 9 and also does not require the coordinated finger press. Thus, the devices equipped with actuator members are much more user friendly and easier to operate. Furthermore, an operator can use any part of their hand, or even arm, to actuate the dispensing of fluid from the container.

A further advantage of the embodiments shown in FIGS. 10, 11 and 12*a-d* is that the over cap 2001 provides an increased mechanical efficiency due to the leverage provided about the pivot point of the actuator member.

The air chamber may also be used in embodiments of the invention that comprise two liquid-containing chambers and are adapted to simultaneously eject two liquids at the same time. An example of such an embodiment is shown in FIG. 10. The air from the air chamber 2600 could be mixed with one or both of the liquids dispensed from these chambers prior to ejection through the outlet of the device.

As a further alternative, a second liquid may be provided in the air chamber 2600 instead of air. The chamber 2600 could be a self-contained reservoir of liquid and the amount of liquid dispensed with each actuation could be limited by the dimensions of the outlet channel 2607. Alternatively, the chamber 2600 may draw fluid a compartment in the container to which it is attached, in a similar manner to the way the chamber 201 is replenished after each actuation.

The embodiments shown in FIGS. 12*a-d* could be made from a single, integrally formed component part, as shown, or could be formed from several separate component parts that are assembled together to form the device. The device would usually be moulded from a rigid plastic. The necessary deformability for certain parts of the structure can be provided by making these required sections of a reduced thickness, which imparts the necessary deformability characteristics into the design.

The embodiments shown in the Figures will usually be fitted to a container, which provides a reservoir of liquid to be drawn into the chamber 201. However, in some cases, a liquid reservoir may be integrally formed with the device.

Figure 13A:
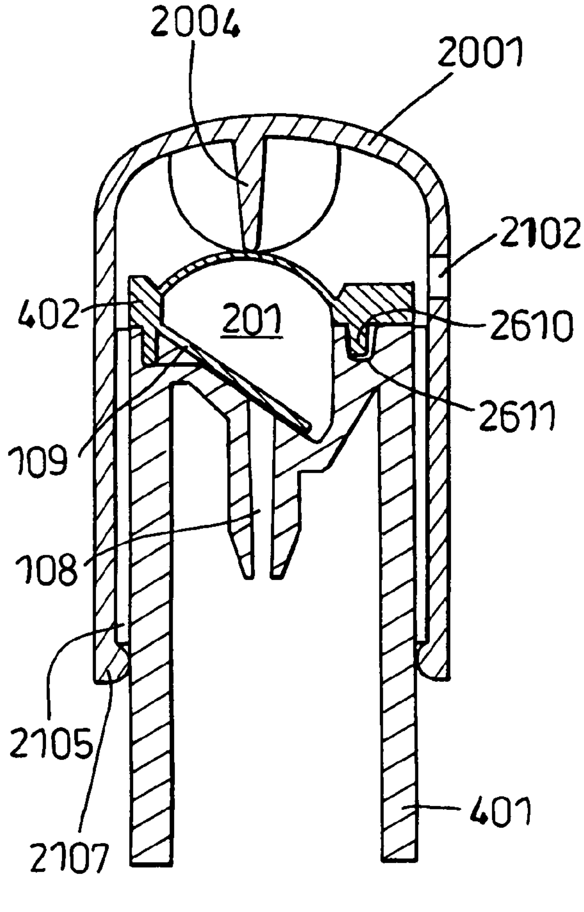
FIGS. 13*a* and 13*b* show cross-sectional and perspective views, respectively, of a further embodiment of the invention.
Figure 13B:
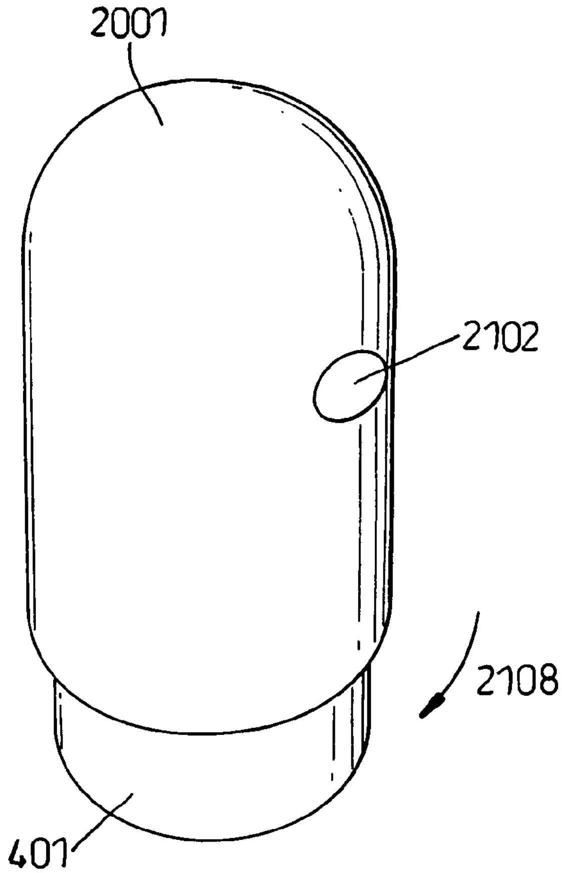

FIGS. 13*a* and 13*b* show a further alternative embodiment of the present invention provided with an alternative form actuator member in the form of a modified over cap 2001. The over cap 2001 shown in FIGS. 13*a* and 13*b* is fitted over the upper part 102 of the nozzle arrangement and is slidably mounted to the body of the nozzle device. Thus, the nozzle device is configured to slide downwards from its uppermost the upper position shown in FIG. 13*a* so that the protrusion 2004 formed on the under surface of the over cap 2001 engages and deforms the resiliently deformable portion 102*b* of the upper part 102, thereby compressing the chamber 201 and causing any fluid present therein to be ejected as a spray through the orifice 2102 formed in over cap (which aligns with the outlet 403 when the over cap is pressed downwards). The over cap 2001 can then be slid back to its initial position, either by the operator lifting the cap or by a resilient means which urges the cap upwards once any downward pressure is removed. An annular lip 2105 abuts the annular detent 2107 formed on the base to limit the upward movement of the over cap. The cap 2001 may also be twisted (as shown by arrow 2108 in FIG. 13*b*) so that the ridges are further engaged to prevent any downward movement, thereby locking the over cap 2001 to prevent accidental actuation of the nozzle arrangement.

Figure 14A:
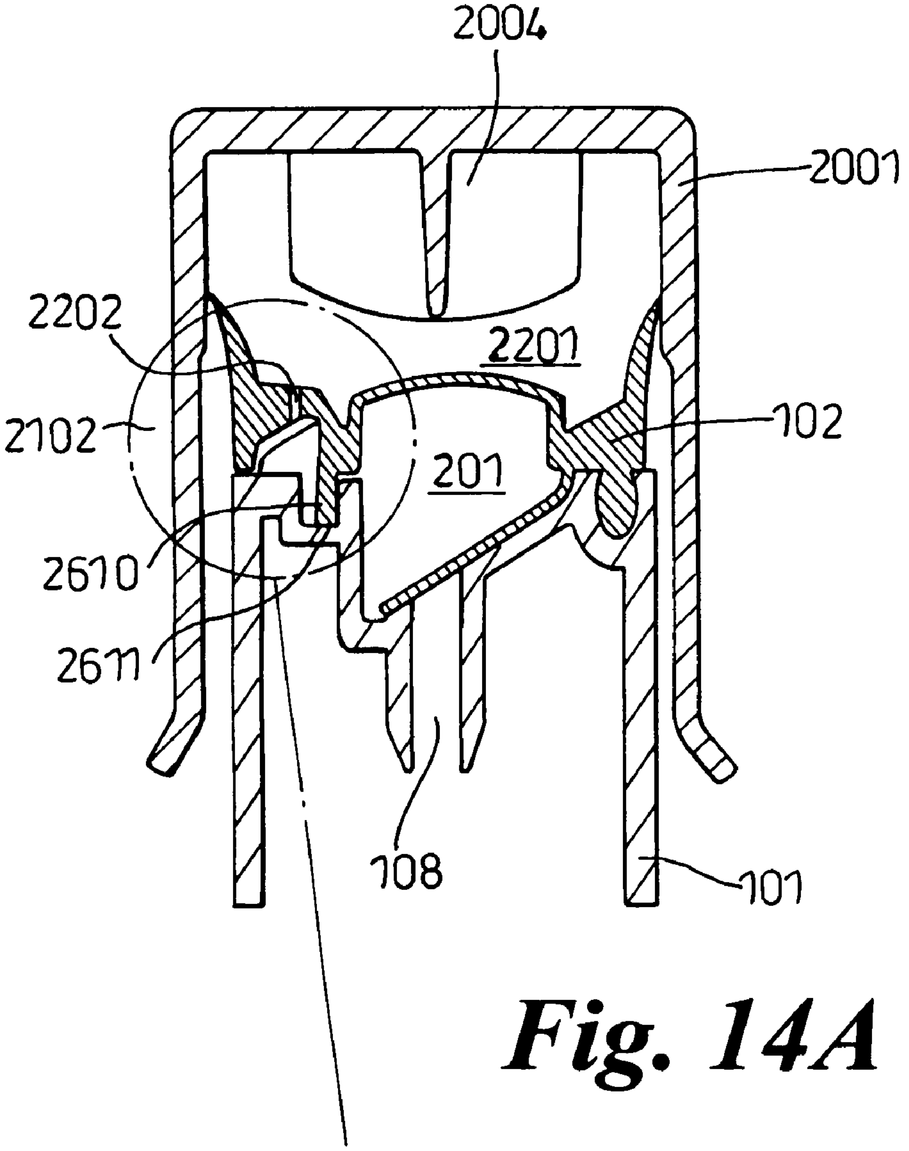
FIGS. 14*a* and 14*b* show cross-sectional and perspective views, respectively, of a further embodiment of the invention.

A further modified version of the spray-dispenser shown in FIGS. 13*a* and 13*b* is illustrated in FIG. 14*a*. This embodiment additionally incorporates a compressible air chamber 2201 defined between the over cap 2001 and the upper part 102 of the body. Thus, when the over cap 2001 is depressed, the air within the chamber is expelled through the air chamber outlet 2202 so that it mixes with fluid expelled from the chamber 201.

Figure 14B:
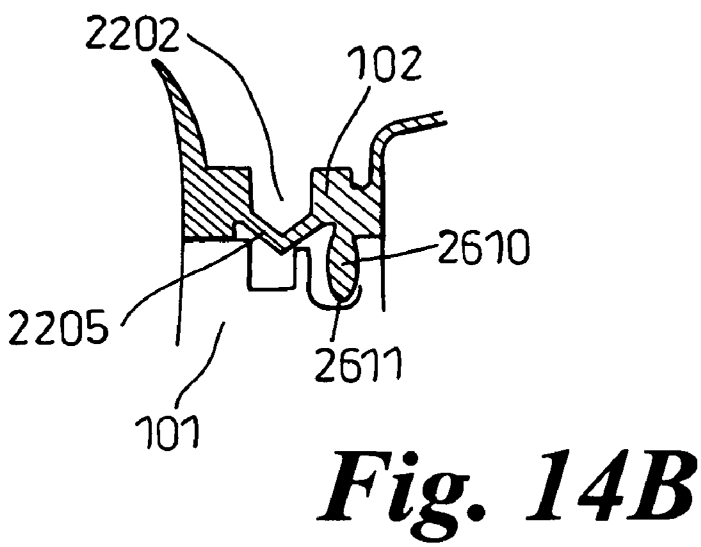

In an alternative embodiment, the air chamber outlet 2202 may be provided with a one way outlet valve 312, as shown in FIG. 14B. When the pressure within the air chamber 2201 exceeds a predetermined threshold value the arms of the valve member 2202 will deform apart from one another to define an opening through which the air can flow into the outlet passageway. In this case, air will not be able to flow back into the air chamber through the valve 2202 so a separate air inlet must be provided. Such an inlet will comprise a one way inlet valve adapted to permit air to flow through the air inlet when the pressure within the chamber 2201 falls below the external pressure by at least a minimum threshold amount.

Figure 15:
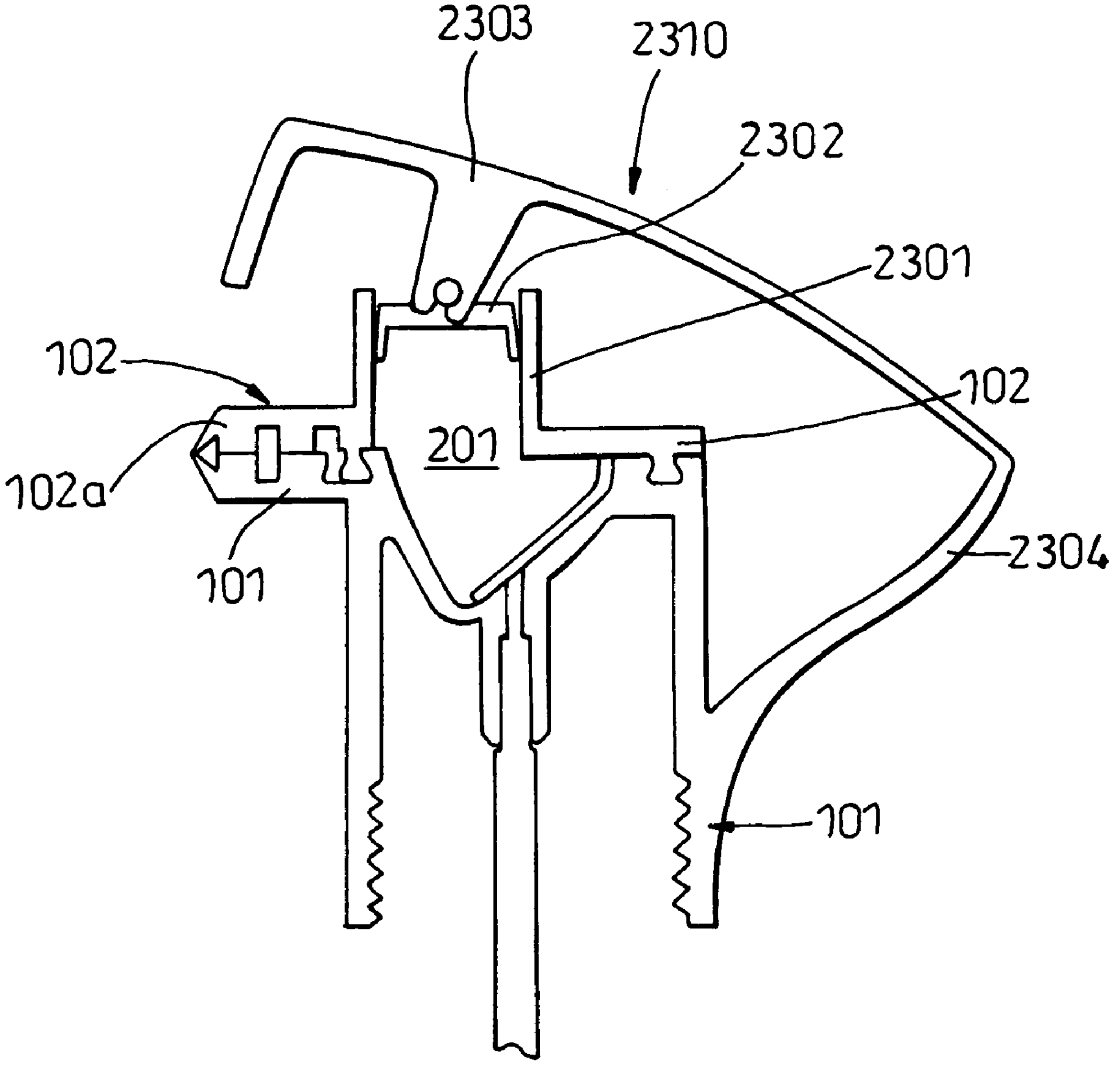
FIG. 15 is a cross-sectional view of a nozzle device of the invention comprising a piston assembly for compressing the chamber.

FIG. 15 shows a further alternative embodiment of the invention that, instead of utilising a resiliently deformable portion of the body to enable the chamber to be compressed, incorporates a piston cylinder 2301 as an integral portion of the body defining the chamber. A piston 2302 is slidably mounted within the piston cylinder 2301. Movement of the piston to compress the chamber 201, and thereby expel the contents stored therein, is facilitated in the embodiment shown in FIG. 15 by depressing actuator member 2303, to which the piston 2302 is mounted, in the direction of arrow 2310. The actuator member is connected to the base 101 by a resilient deformable hinge 2304. When the pressure applied to the arm portion 2303 is subsequently released, it will return to the position shown in FIG. 15 due to the inherent resilience of the hinge 2304.

It shall be appreciated that the description of the embodiments of the invention described in reference to the figures is intended to be by way of example only and should not construed as limiting the scope of the invention.

What is claimed is:

1. A pump-action nozzle device configured to enable fluid to be dispensed from a container, said nozzle having a body which defines an internal chamber having an inlet through which fluid may be drawn into said chamber and an outlet through which fluid present in the chamber may be expelled from the nozzle, said inlet comprising an inlet valve adapted to only permit fluid to flow into the chamber through the inlet when the pressure within the chamber falls below the pressure within the interior of the container to which the device is attached by at least a predetermined minimum threshold amount and said outlet comprising an outlet valve configured to only permit fluid to flow out of the chamber and be expelled from the nozzle when the pressure within the chamber exceeds the external pressure at the outlet by at least a predetermined threshold amount, wherein at least a portion of the body which defines said chamber is configured to:

(a) resiliently deform from an initial resiliently biased configuration to a distended or deformed configuration in response to the application of a pressure, whereby the volume of said chamber defined by said portion of the body is reduced as said portion of the body is deformed from said initial configuration to said distended or deformed configuration, said reduction in volume causing the pressure within the chamber to increase and fluid to be ejected through the outlet valve; and (b) subsequently return to its initial resiliently biased configuration when the applied pressure is removed, thereby causing the volume of the chamber to increase and the pressure therein to fall such that fluid is drawn into the chamber through the inlet valve;

said nozzle device comprises an actuator member which extends over at least a portion of said portion of the body and is configured to engage said portion of the body and cause it to deform from its resiliently biased configuration when a pressure is applied to the actuator member;

wherein said inlet comprises an inlet opening and said inlet valve comprises a deformable flap positioned over the inlet opening and a second reinforcing flap which contacts an opposing surface of the deformable flap and which is configured to urge the deformable flap into tight abutment with the body about the inlet opening, said deformable flap being adapted to deform so as to allow fluid to be drawn into the chamber through the inlet when the pressure within the chamber falls below said predetermined minimum threshold level and to subsequently return to its closed configuration at all other times.

2. A pump-action nozzle device according to claim 1, in which the deformable flap is resiliently deformable and is resiliently biased into abutment with the body about the inlet opening.

3. A pump-action nozzle device according to claim 2, wherein the resiliently deformable flap is an integral extension of the resiliently deformable portion of the body which defines the chamber.

4. A pump-action nozzle device according to claim 1, wherein a raised lip is positioned around the inlet opening, and the deformable flap abuts the raised lip.

5. A pump-action nozzle device according to claim 1, wherein the inlet comprises an inlet passage and the deformable flap comprises a protrusion which is configured to extend into the passage and abut the surface of the passage when the inlet valve is closed.

6. A pump-action nozzle device according to claim 1, wherein said actuator member includes an arm for an operator to push to cause said portion of the body to deform.

7. A pump-action nozzle device according to claim 1, wherein said actuator member is a cap that extends over the resiliently deformable portion of the body to form a surface which can be depressed by an operator in order to cause said portion of the body to deform and thereby actuate the dispensing of fluid from the chamber of the device.

8. A pump-action nozzle device according to claim 7, wherein said surface formed by the cap comprises a rigid or substantially rigid non-deformable surface.

9. A pump-action nozzle device according to claim 8, wherein said surface comprises a continuous surface.

10. A pump-action nozzle device according to claim 1, wherein said actuator member is slidably mounted to the body of the nozzle device such that, when a pressure is applied to the actuator member, it slides relative to the body of the nozzle device and urges said resiliently deformable portion of the body to deform from its resiliently biased configuration.

11. A pump-action nozzle device according to claim 1, wherein said actuator member is pivotally mounted to the body of the device such that the application of a pressure to said actuator member causes it to pivot about its pivotal mounting and cause said resiliently deformable portion of the body to deform from its resiliently biased configuration.

12. A pump-action nozzle device according to claim 1, wherein said actuator member is integrally formed with the body.

13. A pump-action nozzle device according to claim 12, wherein said actuator member is connected to the body of the device by a foldable connection element and is configured to pivot about the connection element to enable said portion of the body to be deformed.

14. A pump-action nozzle device according to claim 1, wherein said nozzle is adapted to be fitted to an opening of a container to enable fluid stored in said container to be dispensed during use.

15. A pump-action nozzle device according to claim 1, wherein said nozzle is integrally formed with said container to enable fluid stored in said container to be dispensed during use.

16. A pump-action nozzle device according to claim 1, wherein the body of the nozzle device comprises two or more interconnected parts, which, when connected together, define the chamber.

17. A pump-action nozzle device according to claim 16, wherein the chamber of the nozzle device is defined between two interconnected parts.

18. A pump-action nozzle device according to claim 17, wherein one of said parts is a base part and the other of said parts is an upper part.

19. A nozzle arrangement according to claim 18, wherein the upper part comprises said resiliently deformable portion of the body that defines the chamber.

20. A pump-action nozzle device according to claim 19, wherein the inlet is defined in the base part and the inlet opening is disposed at an elevated position within the chamber, the chamber having a reservoir area below the inlet opening into which the fluid can flow from the inlet.

21. A pump-action nozzle device according to claim 19, wherein at least the upper part being formed by means for providing a framework or base molded from a rigid plastics, and at least the deformable portion defining the chamber formed by over molding a flexible plastics material onto the framework.

22. A pump-action nozzle device according to claim 21, wherein the resiliently deformable flap comprises a flexible plastics material.

23. A pump-action nozzle device according to claim 16, wherein the two or more interconnected parts are fixed together by ultrasonic or heat welding.

24. A pump-action nozzle device according to claim 16, wherein a seal is disposed between the at least interconnected two parts when they are assembled together, to prevent fluid from leaking out of the nozzle between them.

25. A pump-action nozzle device according to claim 16, wherein the outlet of the device comprises the outlet valve, an outlet orifice and an outlet passageway that connects the chamber to the outlet orifice.

26. A pump-action nozzle device according to claim 25, wherein the outlet passageway comprises internal means for modifying the spray to reduce the size of the liquid droplets dispensed through the outlet orifice of the nozzle device during use.

27. A pump-action nozzle device according to claim 26, wherein said internal spray modifying means being selected from a group consisting of one or more expansion chambers, one or more swirl chambers, one or more internal spray orifices adapted to generate a spray of fluid flowing through within the outlet passageway, and one or more venturi chambers.

28. A pump-action nozzle device according to claim 26, wherein the internal spray modifying means comprises one or more expansion chambers.

29. A pump-action nozzle device according to claim 26, wherein the internal spray modifying means comprises two or more expansion chambers.

30. A pump-action nozzle device according to claim 26 wherein the internal spray modifying means comprises one swirl chamber.

31. A pump-action nozzle device according to claim 26, wherein the internal spray modifying means comprises two swirl chambers.

32. A pump-action nozzle device according to claim 26, wherein the internal spray modifying means comprises three or more swirl chambers.

33. A pump-action nozzle device according to claim 26, wherein the internal spray modifying means comprises two internal spray orifices.

34. A pump-action nozzle device according to claim 26, wherein the internal spray modifying means comprises three or more internal spray orifices.

35. A pump-action nozzle device according to claim 26, wherein the internal spray modifying means comprises one or more venturis.

36. A pump-action nozzle device according to claim 25, wherein said at least two parts that define the chamber also define at least a portion of the outlet passageway.

37. A pump-action nozzle device according to claim 25, wherein the outlet valve is formed by a portion of one of said parts being resiliently biased against the other of said parts to close the outlet or a passageway leading thereto, said resiliently biased portion being configured to deform away from the other of the parts to define an open outlet or passage leading thereto when the pressure within the chamber exceeds the external pressure by at least a minimum threshold level.

38. A pump-action nozzle device according to claim 37, wherein the outlet valve is formed between surfaces of the at least two parts which abut when the parts are assembled to form the body.

39. A pump-action nozzle device according to claim 37, wherein the abutment surface of one of the parts comprises a resiliently deformable valve member that is resiliently biased against the other of the parts to close the outlet orifice or the passageway leading thereto and is configured to deform away from the other of said parts to define an open outlet or passage leading thereto when the pressure within the chamber exceeds the external pressure by at least a minimum threshold amount.

40. A pump-action nozzle device according to claim 37, wherein said outlet valve member comprises a flap or a plug.

41. A pump-action nozzle device according to claim 1, wherein the inlet, inlet valve, outlet, outlet valve, and chamber are all defined by the body.

42. A pump-action nozzle device according to claim 1, wherein the outlet valve comprises a one way valve that provides an air tight seal.

43. A pump-action nozzle device according to claim 1, wherein said body comprises a maximum of three component parts.

44. A pump-action nozzle device according to claim 1, wherein said body comprises two separate component parts.

45. A pump-action nozzle device according to claim 1, wherein said body comprises a single component part.

46. A pump-action nozzle device according to claim 1, wherein the device comprises a rigid plastics material.

47. A pump-action nozzle device according to claim 1, wherein the entire device comprises a flexible plastics material.

48. A pump-action nozzle device according to claim 1, wherein the device comprises said body being at least partly formed by means for providing a first component part of the body formed from a first material and a second part of the body formed from the same or a different material molded onto the first part.

49. A pump-action nozzle device according to claim 48, wherein the outer surfaces of the device being over molded with a flexible plastics material to provide a soft touch.

50. A pump-action nozzle device according to claim 1, wherein the nozzle device comprises means for locking the device to prevent fluid being dispensed accidentally.

51. A pump-action nozzle device according to claim 50, wherein the locking means is integrally formed with the body.

52. A pump-action nozzle device according to claim 1, wherein the device further comprises an air leak valve through which air can flow to equalize any pressure differential between the interior of the container and the external environment, said air leak valve further preventing any fluid leaking out of the container if it is inverted.

53. A pump-action nozzle device according to claim 1, wherein said nozzle device comprises at least one component part formed by injection moulding, and wherein a blowing agent is incorporated into a mold together with a plastic material.

54. A pump-action nozzle device according to claim 1 fitted to an opening of the container to enable the fluid stored in the container to be dispensed from the container through said nozzle device during use.

55. A pump-action nozzle device according to claim 1 integrally formed on the container to enable the fluid stored in the container to be dispensed from the container through said nozzle device during use.

56. A pump-action nozzle device configured to enable fluid to be dispensed from a container, said nozzle having a body which defines an internal chamber having an inlet through which fluid may be drawn into said chamber and an outlet through which fluid present in the chamber may be expelled from the nozzle, said inlet comprising an inlet valve adapted to only permit fluid to flow into the chamber through the inlet when the pressure within the chamber falls below the pressure within the interior of the container to which the device is attached by at least a predetermined minimum threshold amount and said outlet comprising an outlet valve configured to only permit fluid to flow out of the chamber and be expelled from the nozzle when the pressure within the chamber exceeds the external pressure at the outlet by at least a predetermined threshold amount;

wherein said inlet comprises an inlet opening and said inlet valve comprises a deformable flap positioned over the inlet opening and a second reinforcing flap which contacts an opposing surface of the deformable flap and which is configured to urge the deformable flap into tight abutment with the body about the inlet opening, said deformable flap being adapted to deform so as to allow fluid to be drawn into the chamber through the inlet when the pressure within the chamber falls below said predetermined minimum threshold level and to subsequently return to its closed configuration at all other times.

57. A pump-action nozzle device according to claim 56, in which the deformable flap is resiliently deformable and is resiliently biased into abutment with the body about the inlet opening.

58. A pump-action nozzle device according to claim 57, wherein the resiliently deformable flap is an integral extension of a resiliently deformable portion of the body which defines the chamber.

59. A pump-action nozzle device according to claim 56, wherein a raised lip is positioned around the inlet opening, and the deformable flap abuts the raised lip.

60. A pump-action nozzle device according to claim 56, wherein the inlet comprises an inlet passage, and the deformable flap comprises a protrusion which is configured to extend into the inlet passage and abut the surface of the passage when the inlet valve is closed.

61. A pump-action nozzle device according to claim 56, wherein the inlet is defined in a base part of the body and the inlet opening is disposed in an upper part at an elevated position within the internal chamber having a reservoir area below the inlet opening into which the fluid can flow from the inlet.

62. A pump-action nozzle device according to claim 61, wherein said base part and said upper part are fixed together by ultrasonic or heat welding.

63. A pump-action nozzle device according to claim 61 wherein a seal is disposed between the base part and upper part when they are assembled together to prevent fluid from leaking out of the nozzle between them.

* * * * *